(12) United States Patent
Poliquin et al.

(10) Patent No.: US 9,353,918 B2
(45) Date of Patent: May 31, 2016

(54) SYSTEM AND METHOD FOR COMMUNICATION AMONG LINEAR LIGHT MODULES IN A LIGHTING SYSTEM

(71) Applicant: Lumenetix, Inc., Scotts Valley, CA (US)

(72) Inventors: Thomas Poliquin, Aptos, CA (US); Dustin Cochran, Boulder Creek, CA (US); Herman Ferrier, Scotts Valley, CA (US); David Bowers, San Jose, CA (US); James Kingman, Woodside, CA (US)

(73) Assignee: LUMENETIX, INC., Scotts Valley, CA (US)

( * ) Notice: Subject to any disclaimer, the term of this patent is extended or adjusted under 35 U.S.C. 154(b) by 283 days.

(21) Appl. No.: 13/843,597

(22) Filed: Mar. 15, 2013

(65) Prior Publication Data

US 2014/0167617 A1   Jun. 19, 2014

Related U.S. Application Data

(60) Provisional application No. 61/737,776, filed on Dec. 15, 2012, provisional application No. 61/737,777, filed on Dec. 15, 2012, provisional application No. 61/737,779, filed on Dec. 15, 2012, provisional application No. 61/737,780, filed on Dec. 15, 2012.

(51) Int. Cl.
*H05B 37/02* (2006.01)
*H05B 39/04* (2006.01)
*H05B 41/36* (2006.01)
(Continued)

(52) U.S. Cl.
CPC ... *F21K 9/54* (2013.01); *F21S 2/00* (2013.01); *F21V 21/005* (2013.01); *F21V 23/004* (2013.01); *F21V 29/006* (2013.01); *G02B 5/02* (2013.01); *G02B 5/0268* (2013.01); *G02B 6/0006* (2013.01); *G02B 6/0096* (2013.01); *G02B 6/46* (2013.01); *H05B 33/0803* (2013.01); *H05B 33/0857* (2013.01); *H05B 33/0869* (2013.01); *H05B 33/0872* (2013.01); *F21Y 2101/02* (2013.01); *F21Y 2103/00* (2013.01);
(Continued)

(58) Field of Classification Search
CPC ............ F21Y 2101/02; H05B 33/0857; H05B 37/0245; H05B 33/0863; H05B 33/0803; F21W 2131/406
USPC .................................................. 315/149, 151
See application file for complete search history.

(56) References Cited

U.S. PATENT DOCUMENTS

2006/0197474 A1* 9/2006 Olsen ................. H05B 33/0821
315/312

*Primary Examiner* — Lincoln Donovan
*Assistant Examiner* — Diana J Cheng
(74) *Attorney, Agent, or Firm* — Perkins Coie LLP

(57) ABSTRACT

Light source systems and methods of operating the light source systems are disclosed. A light source system may include a combination of two lighting modules in communication with each other. The lighting modules can operate in concert, in parallel, or as master or slave. A printed circuit board assembly (PCBA) of the light source system includes electrical circuitry to drive a set of light emitting diodes (LEDs). The PCBA can include a communication interface for communication amongst the lighting modules. The PCBA can also include an optical sensor to provide color spectrum feedback to a controller module for self calibration. A master PCBA can receive sensor feedbacks, such as thermal and optical feedbacks from a slave PCBA. The sensor feedbacks can then be used to tune a color spectrum of a slave lighting module including calibrating the slave lighting module.

31 Claims, 24 Drawing Sheets

System sketch showing a 4-module concept

(51) Int. Cl.
   *F21K 99/00*    (2016.01)
   *F21V 8/00*     (2006.01)
   *H05B 33/08*    (2006.01)
   *G02B 5/02*     (2006.01)
   *F21V 29/00*    (2015.01)
   *G02B 6/46*     (2006.01)
   *F21V 21/005*   (2006.01)
   *F21V 23/00*    (2015.01)
   *F21S 2/00*     (2016.01)
   *F21Y 101/02*   (2006.01)
   *F21Y 103/00*   (2016.01)
   *F21Y 113/00*   (2016.01)

(52) U.S. Cl.
   CPC ...... *F21Y 2113/005* (2013.01); *Y10T 29/49002* (2015.01)

SECTION C-C

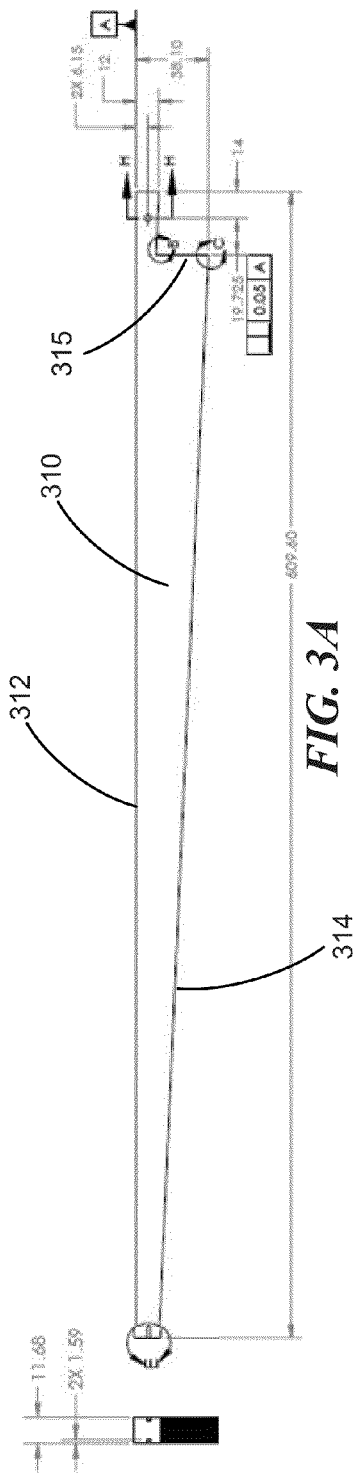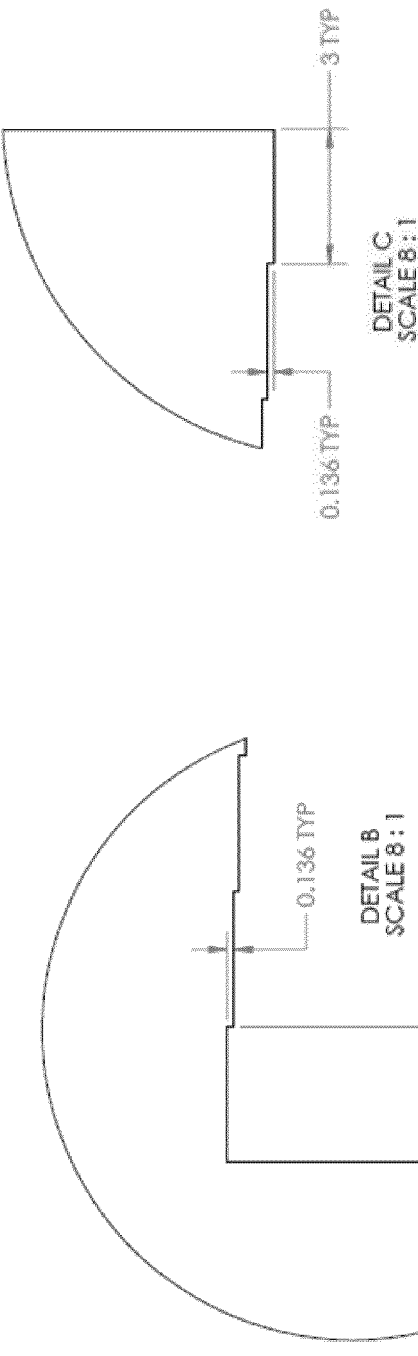
*FIG. 3A*
*FIG. 3B*
*FIG. 3C*

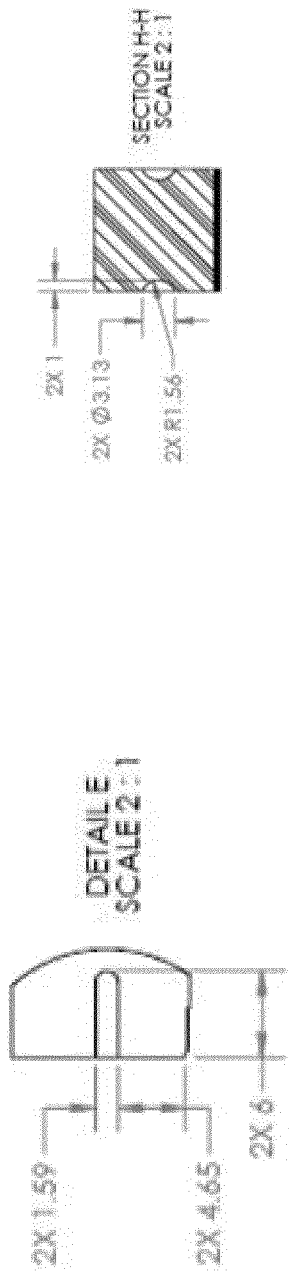
*FIG. 3D*
*FIG. 3E*
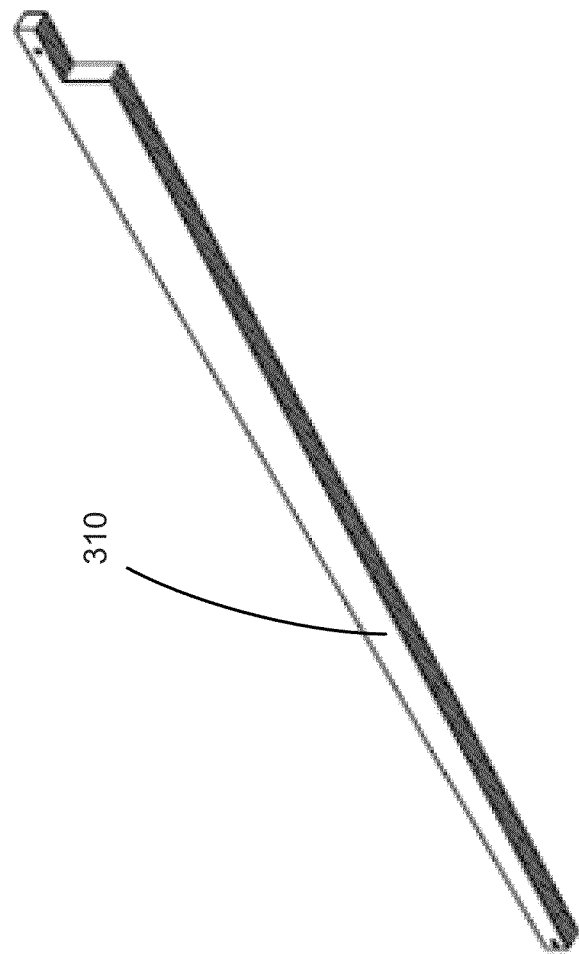
*FIG. 3F*

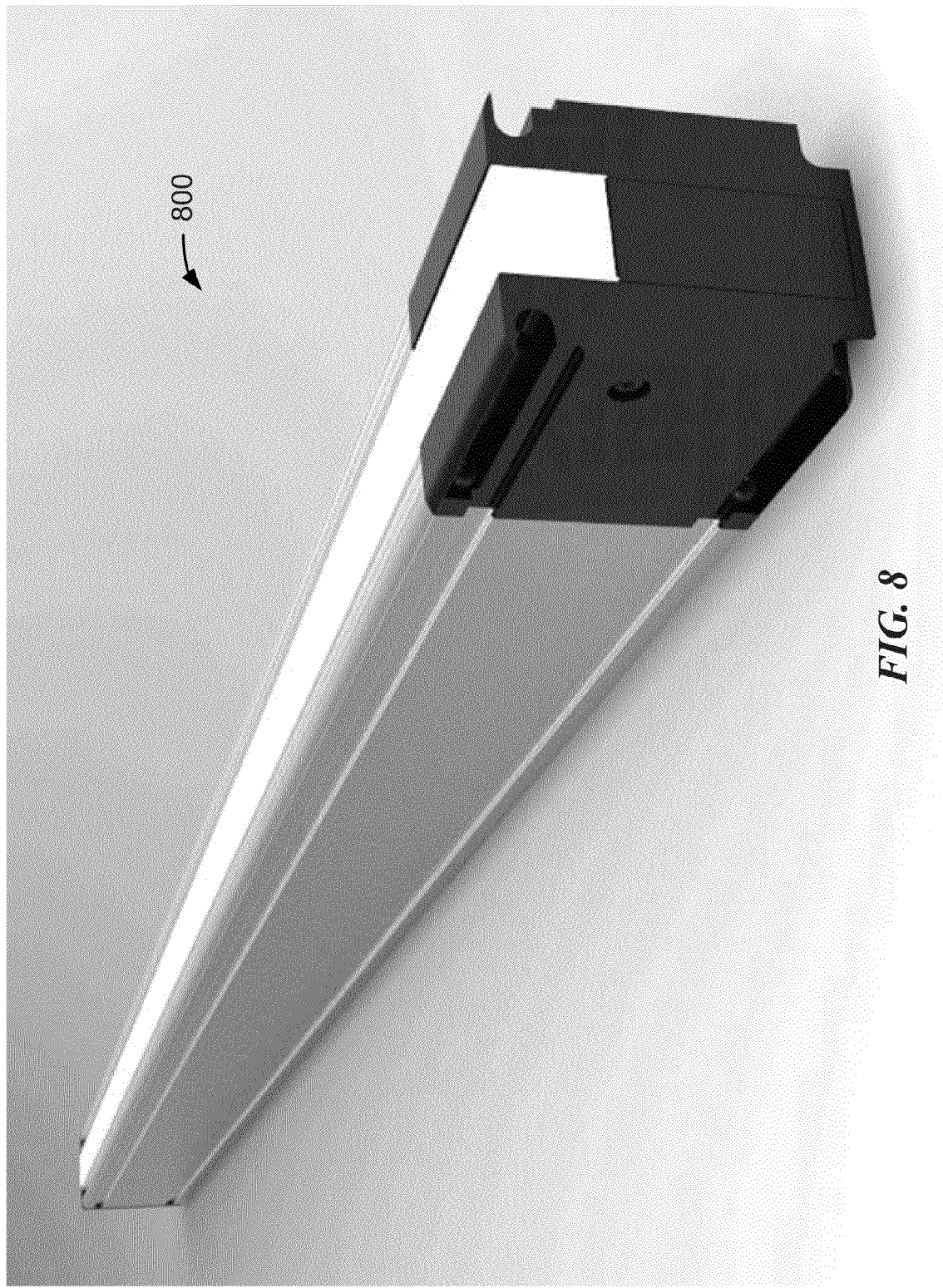

System sketch showing a 4-module concept

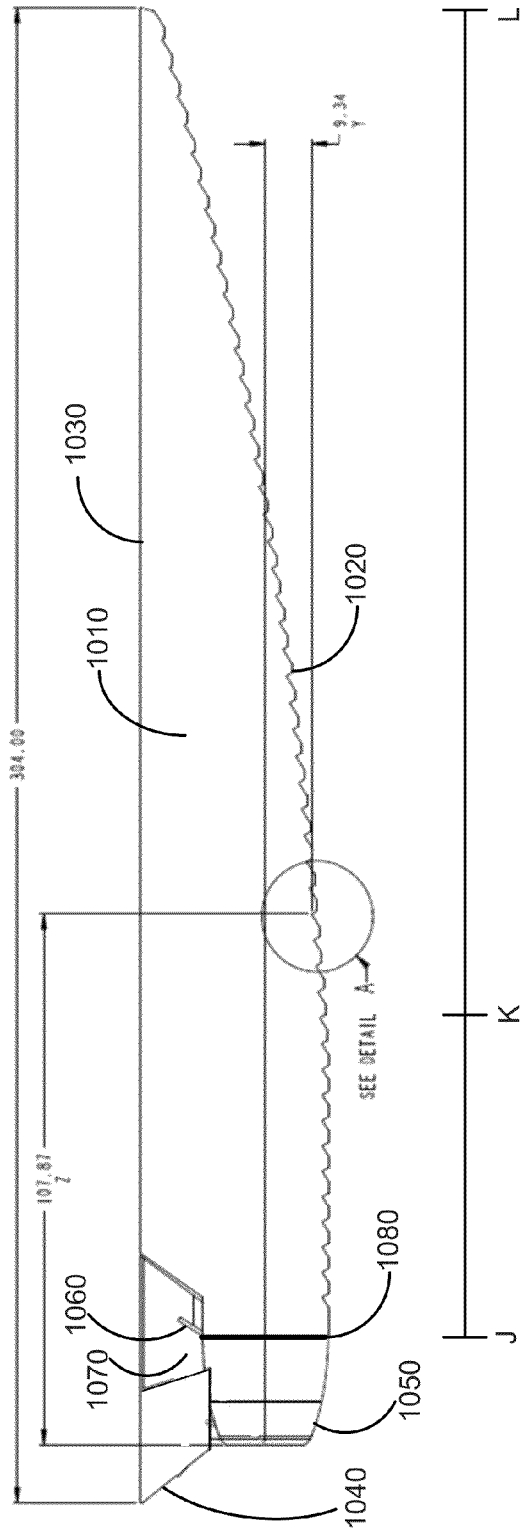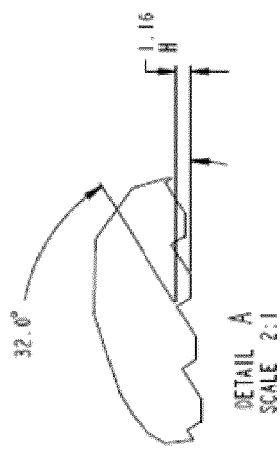
FIG. 10A
FIG. 10B

|   |   |   |
|---|---|---|
| R | W | A |
| G | W | R |
| A | W | B |

*FIG. 12C*

|   |   |   |   |   |
|---|---|---|---|---|
| W | R | G | A | W |
| W | A | R | B | W |

*FIG. 12B*

|   |   |   |   |   |
|---|---|---|---|---|
| R | A | G | W | W |
| R | A | B | W | W |

*FIG. 12A*

SYSTEM AND METHOD FOR COMMUNICATION AMONG LINEAR LIGHT MODULES IN A LIGHTING SYSTEM

CROSS-REFERENCES TO RELATED APPLICATIONS

This application claims the benefit of the following applications which are incorporated by reference in their entireties, U.S. Provisional Application No. 61/737,776, entitled "SYSTEM AND METHOD FOR MIXING AND GUIDING LIGHT EMITTED FROM LIGHT EMITTING DIODES TO A LIGHT PIPE FOR EMISSION IN A LINEAR CONFIGURATION," filed Dec. 15, 2012; U.S. Provisional Application No. 61/737,777, entitled "THERMAL PATH FOR HEAT DISSIPATION IN A LINEAR LIGHT MODULE," filed Dec. 15, 2012; U.S. Provisional Application No. 61/737,779, entitled "MECHANICAL ATTACHMENT SYSTEM FOR LINEAR LIGHT MODULES," filed Dec. 15, 2012; and U.S. Provisional Application No. 61/737,780, entitled "SYSTEM AND METHOD FOR COMMUNICATION AMONG LINEAR LIGHT MODULES IN A LIGHTING SYSTEM," filed Dec. 15, 2012.

BACKGROUND

Conventional systems for controlling lighting in homes and other buildings suffer from many drawbacks. One such drawback is that these systems rely on conventional lighting technologies, such as incandescent bulbs and fluorescent bulbs. Such light sources are limited in many respects. For example, such light sources typically do not offer long life or high energy efficiency. Further, such light sources offer only a limited selection of colors, and the color or light output of such light sources typically changes or degrades over time as the bulb ages. In systems that do not rely on conventional lighting technologies, such as systems that rely on light emitting diodes ("LEDs"), long system lives are possible and high energy efficiency can be achieved. However, in such systems issues with color quality can still exist.

A light source can be characterized by its color temperature and by its color rendering index ("CRI"). The color temperature of a light source is the temperature at which the color of light emitted from a heated black-body radiator is matched by the color of the light source. For a light source which does not substantially emulate a black body radiator, such as a fluorescent bulb or an LED, the correlated color temperature ("CCT") of the light source is the temperature at which the color of light emitted from a heated black-body radiator is approximated by the color of the light source. The CRI of a light source is a measure of the ability of a light source to reproduce the colors of various objects faithfully in comparison with an ideal or natural light source. The CCT and CRI of LED light sources is typically difficult to tune and adjust. Further difficulty arises when trying to maintain an acceptable CRI while varying the CCT of an LED light source and while dimming the intensity level of the LED light source from full intensity to an off condition when no light is emitted at all.

BRIEF DESCRIPTION OF THE DRAWINGS

FIGS. 3A-3F depict different views of another example light pipe.

FIG. 8 shows an example of a linear light module.

FIGS. 10A-10H depict different views of another example light pipe coupled to an optical coupling element.

FIGS. 12A-12C depict example placements of different color LEDs in an LED array.

DETAILED DESCRIPTION

Figure 1A:
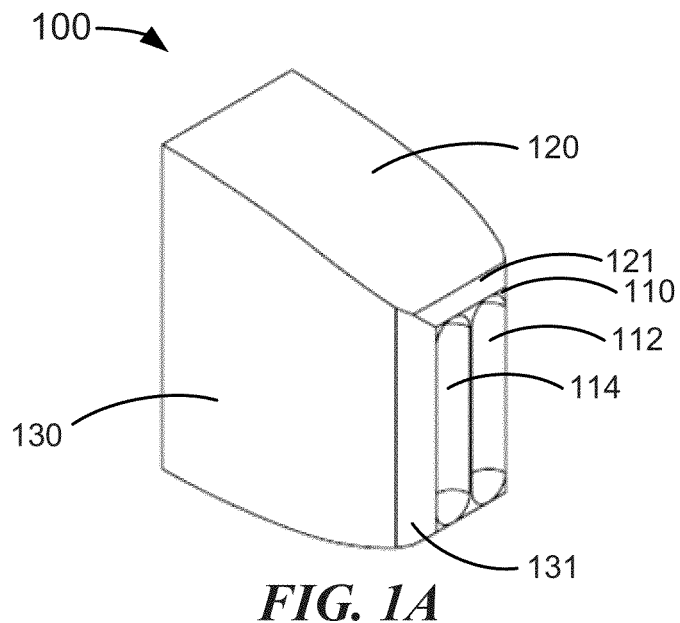
FIGS. 1A-1D depict an example optical coupling element for coupling light emitted from a light emitting diode (LED) array.
Figure 1B:
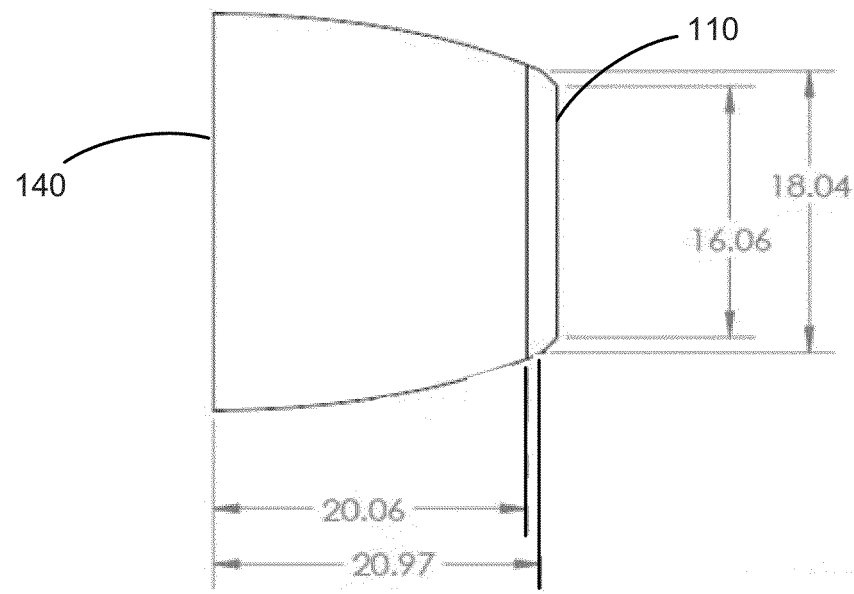
Figure 1C:
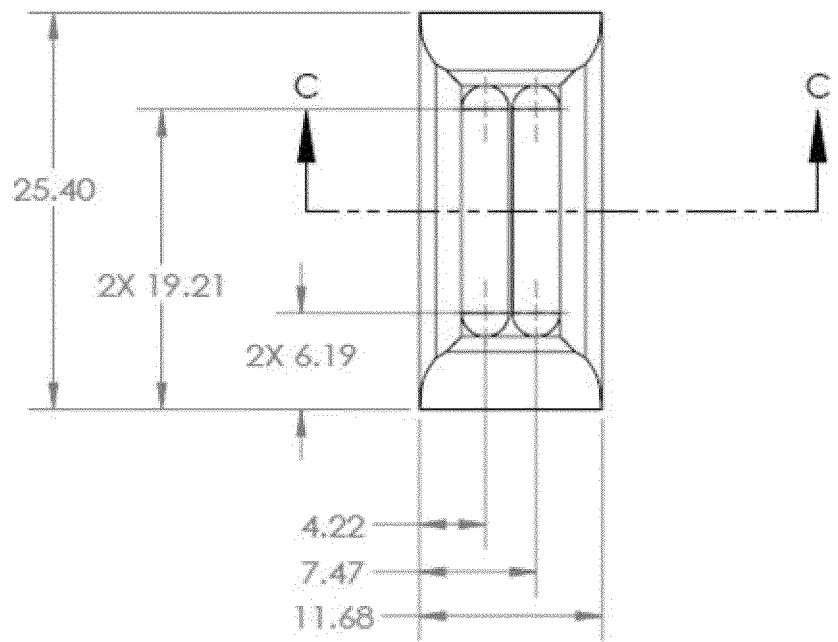

A linear light module that provides a uniform distribution of tunable illumination along the length of the light module is described. Two or more light modules can be used together to provide a seamless longer linear source of illumination. In some embodiments, when multiple light modules are used together in a system, one of the light modules is designated as the primary module which can function as a primary receiver of light tuning commands, and the primary module re-transmits the commands to other modules of the system.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

The correlated color temperature (CCT) of light generated by a lamp is tunable by adjusting the amount of light contributed by distinct sources within the lamp that generate different wavelengths of light. For example, the amount of current supplied to multiple light-emitting diodes (LEDs) that emit light having different peak wavelengths can be adjusted to change the CCT of the light generated by the lamp. Example algorithms for tuning the light emitted by multiple LEDs to a specific CCT is described in more detail in U.S. patent application Ser. No. 13/766,695 entitled, "System and Method for Color Tuning Light Output from an LED-Based Lamp" and is incorporated herein in its entirety. The light emitted by the individual LEDs should be well mixed so that there are no visible hot spots of individual colors, particularly if the illumination surface of the lamp is extended, as with the linear light modules.

FIG. 8 shows an example linear light module that can be used as a modular building block for a lighting system. In some embodiments, the linear light module is designed to be a particular standard length, e.g. one-foot or two-foot long lengths, similar to conventional lighting systems. However, the linear light module can be designed to have any desired length. A visually appealing light is characterized by a uniform illumination intensity along the entire length of the lighting unit without perceptible hot spots or color spots. To accomplish this, the light emitted from the multiple LED sources in the lamp should be efficiently coupled and mixed to provide the uniform illumination as it is directed to the portion of the light module that is visible to users (the white bar in the upper middle of the unit shown in FIG. 8). At the same time, to make the linear light module efficient, the design of the module should prevent light from leaking out of the light module before it reaches the intended emission surface.

Optical Coupling Element and Linear Light Pipe

Figure 1D:
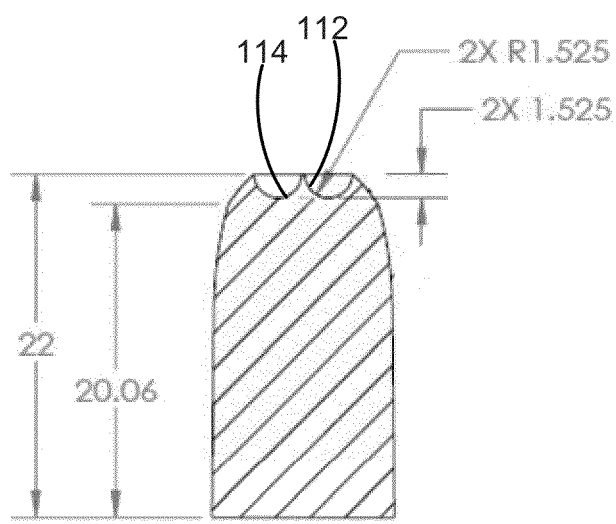

An initial optical coupling element 100 is used to efficiently couple the light emitted by the LEDs. In some embodiments, another type of light source can be used, such as a fluorescent light source or halogen light source. The optical coupling element 100 can be made from any material that transmits the wavelengths of light generated by the LED sources, for example, optical grade acrylic. One example of the optical coupling element is shown in FIGS. 1A-1D. The input surface 110 of the optical coupling element 100 has multiple concave inward cavities. In some embodiments, as shown in FIG. 1A, the input surface 110 has a pair of troughs 112, 114, with each trough sufficiently wide to receive the light emitting surface of a single LED and sufficiently long to receive the light emitting surfaces of multiple LEDs, for example, multiple LEDs arranged in an array. A cross-section of the troughs 112, 114 are shown in FIG. 1D. The troughs are filled with a coupling material, such as silicone gel, to couple the LEDs to the optical coupling element 100. The configuration of concave inward cavities is not limited to two parallel troughs, rather any number of troughs in any convenient layout for one or more LED arrays can be used. In some embodiments (not shown), the input surface 110 can have a dedicated concave cavity for each individual LED in the light source.

The optical coupling element 100 is designed to couple light from the LEDs through the input surface 110 and emit the coupled light through an output surface 140, where the output surface 140 is opposite the input surface 110. In some embodiments, the optical coupling element 100 is symmetrical along the two substantially perpendicular midlines of the input surface 110 or the output surface 140. The input surface 110 and output surface 140 are coupled by several side surfaces of the optical coupling element 100, namely surfaces 130, 131, 120, 121, and the surfaces on the opposite sides of the optical coupling element 100 to these surfaces. These side surfaces are designed to use total internal reflection (TIR) to reflect most of the light from the LEDs within the optical coupling element 100 until the light exits the optical coupling element 100 from output surface 140. For example, light that enters the optical coupling element 100 through input surface 110 can strike a first surface 130 at greater than the critical angle, be totally internally reflected to strike a second surface opposite the first surface at greater than the critical angle to again be totally internally reflected, and exit the output surface 140.

Light rays that strike the surfaces of the optical coupling element 100 at less than the critical angle will be transmitted out of the optical coupling element 100. Thus, the curvatures of the side surfaces of the optical coupling element 100 are designed to ensure that most of the light from the LEDs strike the side surfaces at greater than the critical angle. In some embodiments, the surfaces 130, 131, 120, 121, and their opposing surfaces of the optical coupling element 100 are paraboloids.

Further, to maximize the coupling efficiency of the optical coupling element 100, a reflective surface, such as Miro silver, can be positioned behind each surface 130, 131, 120, 121, and their opposing surfaces to reflect escaping light back into the optical coupling element 100. The reflective surface is separated from the optical coupling element 100 by a small air gap to ensure that conditions for total internal reflection (TIR) are met for angles greater than the critical angle, i.e., the index of refraction of the optical coupling element 100 is greater than the material immediately on the outside of the optical coupling element 100. If the reflective surface is applied directly to the surfaces of the optical coupling element 100, the TIR mechanism would not be effective, rather all the light striking the surface of the optical coupling element 100 would exit the optical coupling element 100 and be directly reflected from the reflective surfaces, resulting in a lossier reflection mechanism. The reflective surfaces in conjunction with the TIR mechanism of the optical coupling element 100 ensure that the amount of light lost between the input surface 110 and the output surface 140 of the optical coupling element 100 is very low. However, in some embodiments, as described below, it may be beneficial to not use the reflective surface behind one or more surfaces of the optical coupling element to allow light to escape from select surfaces into a light pipe.

Figure 2:
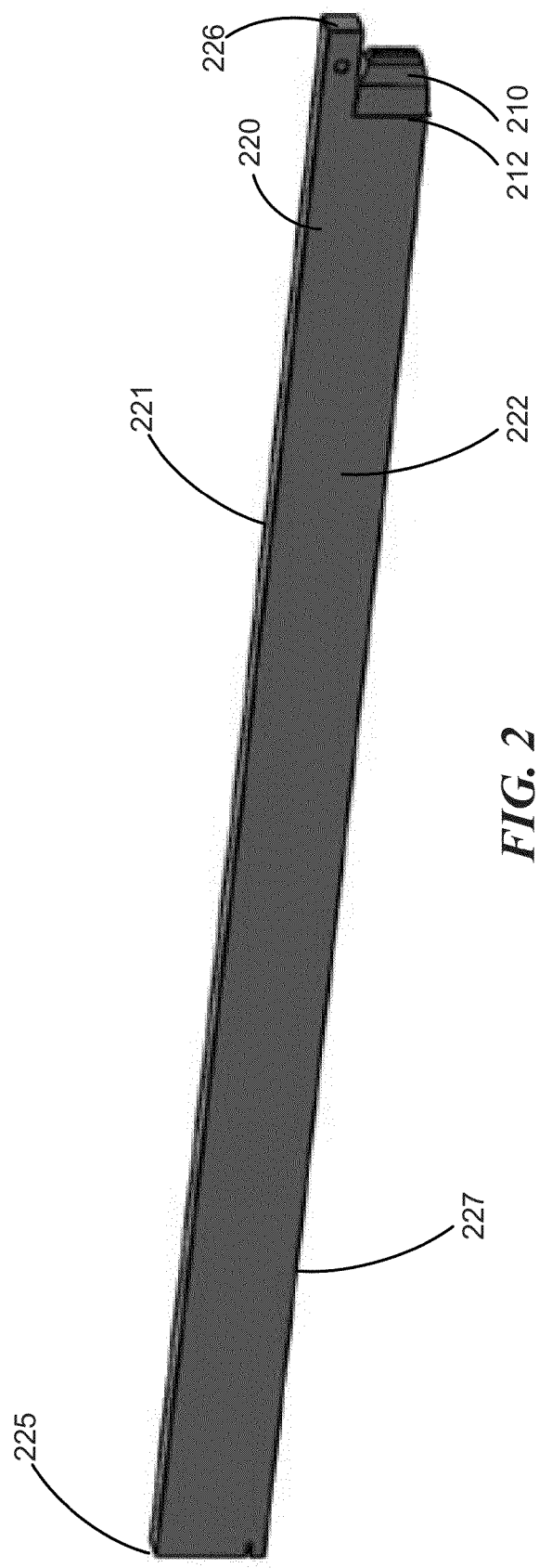
FIG. 2 depicts an example light pipe coupled to an optical coupling element.

In some embodiments, there are two criteria that the light exiting output surface 140 of the optical coupling element 100 should meet. The first criterion specifies a range of exit angles of the light from the output surface 140, such that light satisfying the specified range of exit angles will continue to be reflected via TIR within a light pipe coupled to the output surface 140. Thus, the shape of the light pipe can contribute to the desired range of exit angles. FIG. 2 shows an optical coupling element 210 with an exit surface 212 coupled to an example light pipe 220. The bottom surface 227 of the light pipe 220 is substantially normal to the output surface 212 of the optical coupling element 210, and the top surface 221 (the emitting surface) of the light pipe 220 is substantially parallel to the bottom surface 227. Although the light pipe emission surface 221 is above the height of the optical coupling element 210, the shape of the light pipe 220 is substantially a rectangular solid. The light pipe has an elongated shape to ensure that the light is eventually emitted in the desired linear configuration. Further, the length of the light pipe can be used advantageously to mix the light before being emitted, as described below.

For the example light pipe 310 shown in FIG. 3A, the bottom surface 314 of the light pipe 310 is tapered upward toward the emission surface 312, and the top emission surface 312 is still substantially perpendicular to the surface 315 where the output surface 140 of the optical coupling element 100 would couple to the light pipe 310.

Figure 4A:
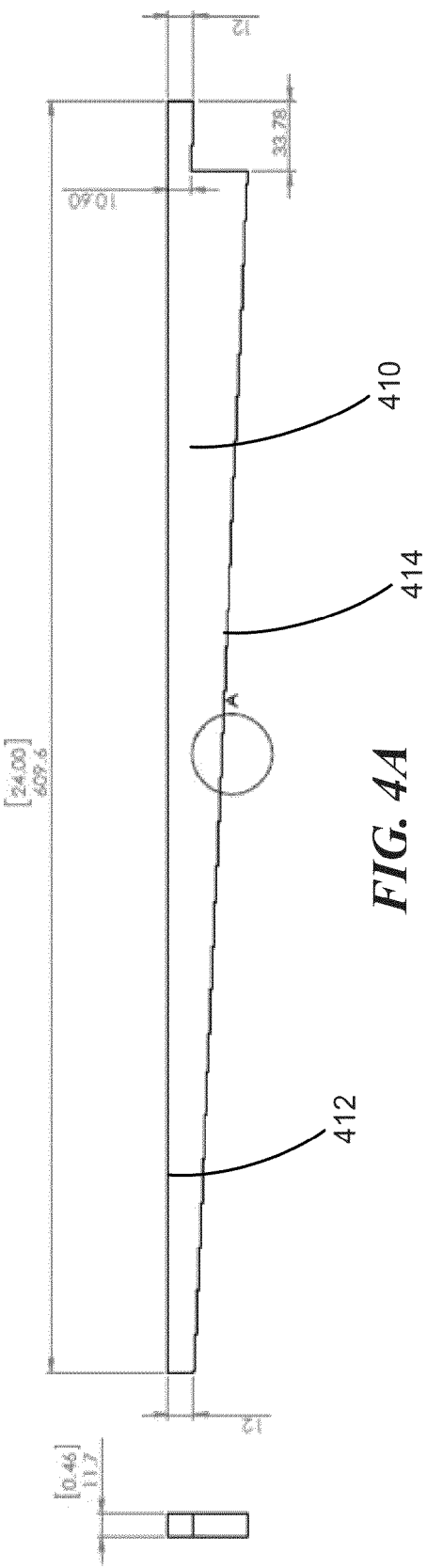
FIGS. 4A-4B depict different views of another example light pipe.

The example light pipe 410 shown in FIG. 4A is similar in shape to the light pipe 310, but the bottom surface 414 is stepped, rather having a smooth taper, and the bottom surface 414 rises toward the emission surface 412. For ease of reference, surfaces herein may be referred to as the bottom surface and the top surface, corresponding to the orientation of the element shown in the figures. However, the element can have any orientation, and the bottom surface does not have to face downward, nor does the top surface have to face upward.

The second criterion specifies an exit aperture so that most of the exiting light will be contained within certain dimensions of the output surface 140. Essentially the rays of light emitted from the extreme edge of the LED array that cross the optical coupling element 100 will have the least steep angle. The angle at which these rays strike the optical coupling element 100 must be greater than the critical angle in order for these light rays to undergo TIR. Thus, these light rays will determine the geometry of the optical coupling element 100, and an additional margin on the angle of these rays can also be taken into account when designing the optical coupling element 100. The second criterion works in conjunction with the first criterion to ensure that most of the light exiting the optical coupling element 100 will be reflected within the light pipe through the mechanism of TIR until the light strikes the desired emission surface of the light pipe.

FIG. 2 illustrates one example configuration where the optical coupling element 210 is coupled to a light pipe 220. Similar to the optical coupling element 100, the light pipe 220 can be made from any material that transmits the wavelengths of light generated by the LED sources, such as optical grade acrylic. The output surface 212 of the optical coupling element 210 is coupled to a side surface of the light pipe 220 using an optical coupling material, such as silicone or coupling gel.

In some embodiments, the top surface 221 of the light pipe 220 is the surface from which the light is emitted by the lighting module, for example, as shown by the white strip of the light module in FIG. 8. Similar to the side surfaces of the optical coupling element 100, three side surfaces of the light pipe are backed by a reflective surface separated from the light pipe by an air gap: the surface 222 as seen in FIG. 2, the surface 227 that is opposite surface 221 (on the bottom of the light pipe as depicted in FIG. 2), and the surface opposite the surface 222. These surfaces are separated from the reflective surface by an air gap so that the TIR mechanism functions to keep most of the light within the light pipe, and only the small percentage of light that strikes the surface of the light pipe 220 at an angle less than the critical angle leaks out of the light pipe, to be reflected back into the light pipe by the reflective surface.

Figure 9:
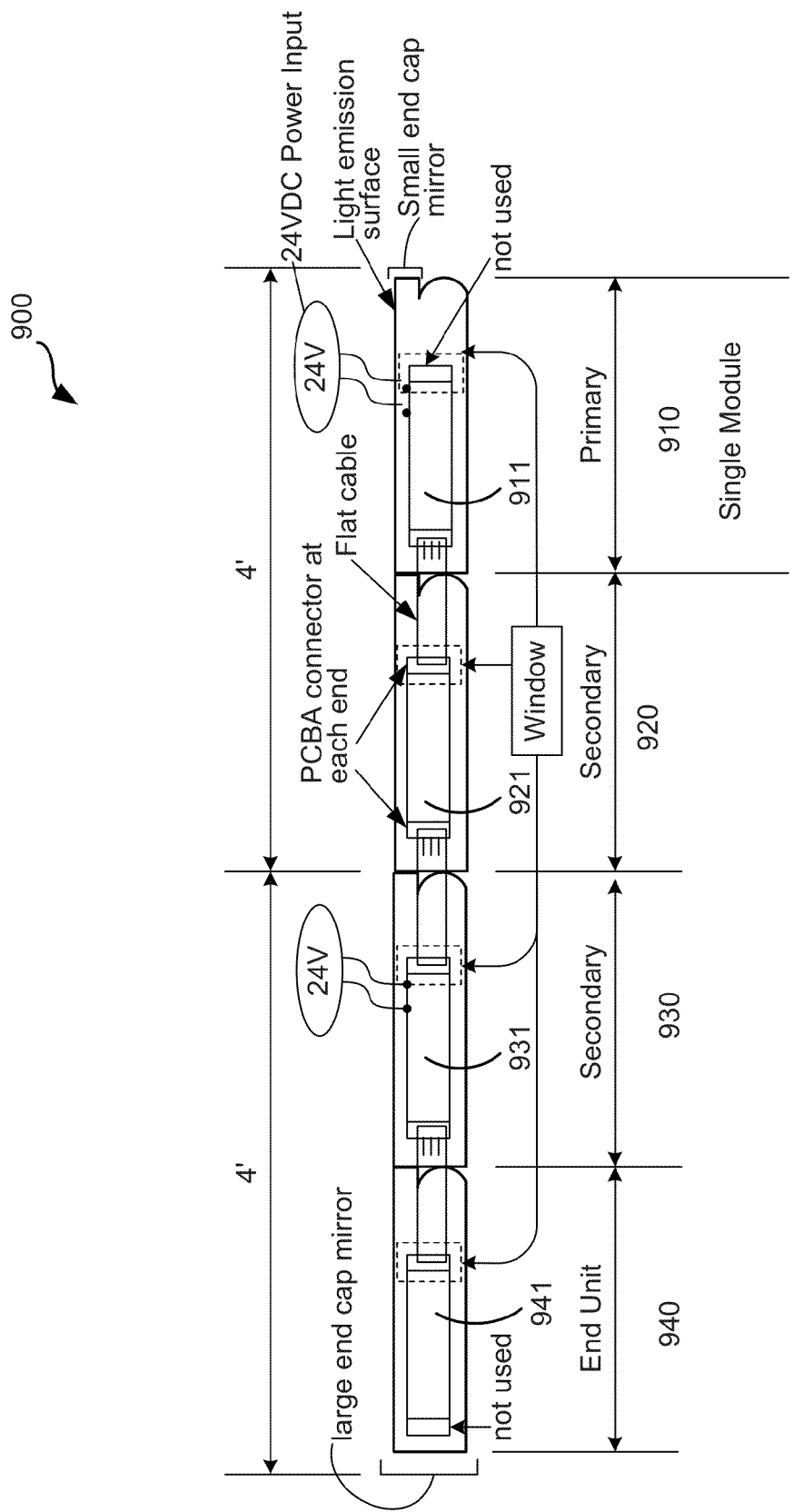
FIG. 9 shows a diagram of an example system that includes four linear light modules.

The light pipe 220 has a distal surface 225 and an opposing end surface 226 near the optical coupling element 210. The distal surface 225 of the light pipe 220 can be placed immediately next to the opposing end surface 226 of a second light pipe to produce a longer light emitting surface. FIG. 9 shows four linear light modules 910, 920, 930, 940 placed immediately adjacent to each other such that the light emitting surfaces of the four modules form a continuous linear surface with no perceptible joint between the light pipes. A system having multiple light modules will be described below.

When a linear light module is used independently of other linear light modules, both the distal surface 225 and the opposing end surface 226 should be covered with reflective caps to prevent light from propagating out the ends of the light pipe 220. Light that is reflected from the end caps back into the light pipe 220 bounces within the light pipe until the light exits the desired emission surface 221.

Because the light coupled from the LED sources by the optical coupling element 100 enters the light pipe 220 from the optical coupling element 210 from a surface 212 that is oriented in a direction substantially perpendicular to the emission surface 221, rather than in a direction toward the emission surface 221 of the light pipe 220, there is a strong axial component to the light rays. The optical coupling element 100 is designed so that the rays entering the light pipe will strike the surface of the light pipe 220 at an angle greater than the critical angle so that the light will undergo TIR instead of exiting a surface of the light pipe 220. Because the light pipe 220 in FIG. 2 is a rectangular solid, the light rays will spiral down the light pipe and be reflected to spiral back in the direction of the light source. It would be advantageous to mix the light while it is traveling down the light pipe so that light from the individual LEDs becomes well mixed to reduce intensity and color hot spots.

One way to mix the light in the light pipe is make the surface opposite the emission surface of the light pipe 220 a rippled surface. For example, small amplitude grooves or ribs can be extruded or molded into the side surfaces of the light pipe. Then the light rays will still undergo TIR reflection at those surfaces of the light pipe, but the rays will no longer reflect in a repeating prismatic pattern. Rather, the rays will be scattered in different directions as they hit the rippled surface and develop a stronger peripheral component and a weaker axial component. In some embodiments, the other surfaces of the light pipe can also be made with a rippled surface.

FIGS. 3A-3F show an example configuration of a light pipe 310 that has a tapered bottom surface 314. FIG. 3A shows a side view of the light pipe 310, and FIG. 3F shows a perspective view of the light pipe 310. Due to the taper of the bottom surface, the angle that a light ray strikes each surface of the light pipe with respect to a surface normal becomes steeper and steeper until the conditions for TIR no longer hold, and the light exits the light pipe. Typically, the light exits the light pipe at an angle near the critical angle so that there is still a strong axial component to the light. Consequently, the intensity of the emitted light does not appear uniform in all directions. To remedy this situation, a diffuser (described below) can be used on the emission surface, the surface of the light pipe opposite the exiting surface, or both.

Figure 4B:
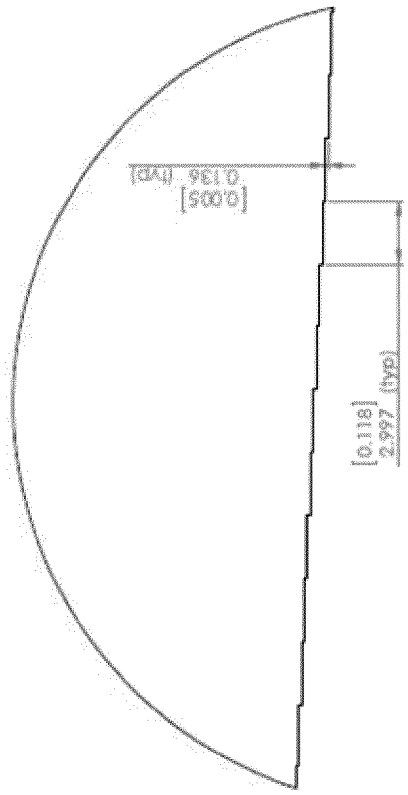

FIGS. 4A-4B show an example configuration of a light pipe 410 that has a stepped bottom surface. The step formation of the bottom surface helps to mix the light within the light pipe so that the emitted light is more uniform.

Figure 10C:
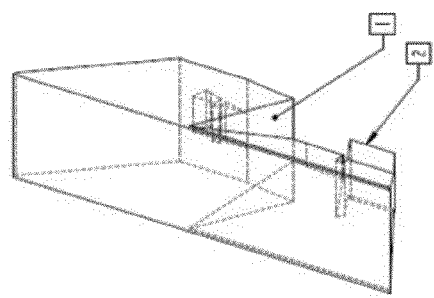
Figure 10D:
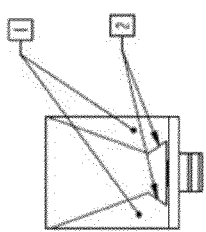
Figure 10E:
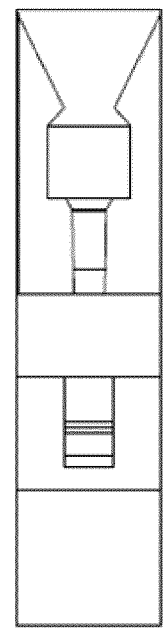
Figure 10F:
Figure 10G:
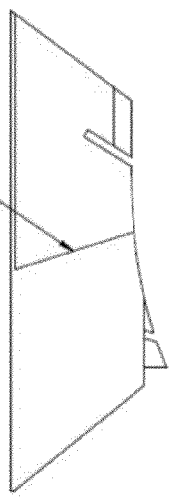
Figure 10H:
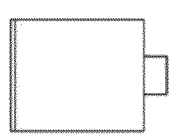

FIGS. 10A-10H show different views of yet another configuration of a light pipe 1010 that has a primarily concave upwards shape along most of the bottom surface 1020 (opposite the emission surface 1030) with a flat portion near the end of the light pipe 1010 with the optical coupling element 1050. Additionally, the bottom surface 1020 has saw-tooth like features. In some embodiments, the amplitude of the features can vary along the length of the bottom surface 1020. For example, as shown in FIG. 10A the amplitude of the features is largest near point J along the length of the bottom surface 1020 and is constant until point K. Then from point K to point L, the amplitude monotonically decreases. In some embodiments, the amplitude of the features can increase or decrease along the length of the bottom surface and can even be random. In some embodiments, the amplitude of the saw-tooth features can be selected to be easily machinable, for example, on the order of a millimeter or greater.

The function of the saw-tooth features is to extract light from the light pipe 1010 to further mix the light from the optical coupling element 1050. As described above, the surfaces of the light pipe 1010, except for the emission surface 1030 are backed by a reflective surface separated from the light pipe 1010 by an air gap. Light extracted from the light pipe by the saw-tooth features is reflected back into the light pipe 1010 through the saw-tooth features into the light pipe 1010 again, causing the light to be mixed.

In some embodiments, finer features on the order of tens of microns to hundreds of microns in amplitude can be used. These finer features can be saw-tooth or convex or concave features, such as dots or bars. The finer features can be periodic, aperiodic, clusters, and/or varying in density. Further, the finer features can be machined or molded as part of the light pipe. Because the function of the features is to extract light from the light pipe, with finer features, there is more control over the uniformity of the light that is emitted by the light pipe.

Further, there is a portion of the light pipe that is above the optical coupling element 1050 and cantilevered out beyond the optical coupling element 1050 on the left, referred to as a bridge 1040. In this embodiment, the side surfaces of the optical coupling element 1050 are backed by a reflective surface separated from the optical coupling element 150 by an air gap, except for portions of or all of the top surface. Instead, at the top surface, the optical coupling element 1050 physically contacts the bridge 1040, thus removing the condition for TIR inside the optical coupling element 1050 and causing some of the light in the optical coupling element 1050 to leak into the bridge 1040. At least at the portions where the optical coupling element 1050 and the bridge make contact, there is no reflective surface used. The bridge 1040 is used to ensure that the light emitted from emission surface 1020 is uniform, primarily in the region above the optical coupling element 1050. In some embodiments, the bridge 1040 is separate from the rest of the light pipe 1010, and is physically attached to the top of the optical coupling element 1050.

To send even more light to the bridge 1040, there is a slot 1060 angled away from the bridge 1040 next to a middle section 1070 within the light pipe 1010. Light exiting the top surface the optical coupling element 1050, where there is no reflective surface backing, will enter the slot and be reflected to the left toward the bridge 1040. The angled sides of the middle section 1070 further reflect the light toward the emission surface 1030.

Figure 11:
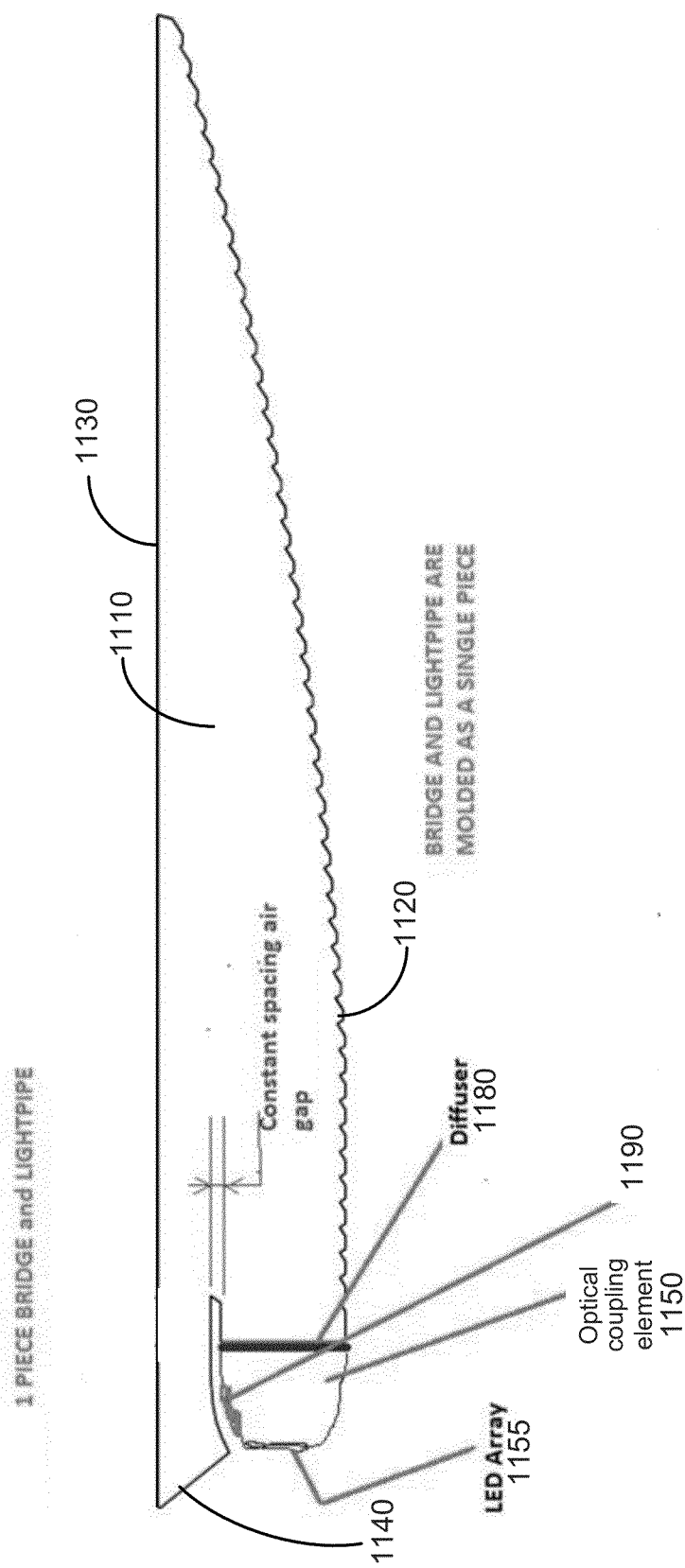
FIG. 11 depicts another example light pipe coupled to an optical coupling element.

FIG. 11 shows yet another configuration of a light pipe 1110 that has a concave upward shape with saw-tooth like features along most of the bottom surface 1120 opposite the emission surface 1130, similar to the light pipe 1010 shown in FIG. 10A. However, the bridge 1140 and light pipe 1110 in the example configuration shown in FIG. 11 are molded as a single piece with an air gap between the optical coupling element 1150 and the bridge 1140. The width of the air gap can be variable or constant. In some embodiments, the width of the air gap can be between approximately 2 mm and 6 mm. The length of the air gap starts from above the LED array 1155 and extends to the diffuser in some embodiments, and beyond the diffuser in other embodiments.

Light is extracted from the optical coupling element 1150 through a light extraction element 1190 coupled to the top surface of the optical coupling element 1150 that is facing toward the bridge 1140. Non-limiting examples of the light extraction element 1190 can include a brightness enhancement film, diffusion film, or other type of diffuser. The length and width of the light extraction element 1190 can be designed to extract a desired amount of light from the optical coupling element 1150 for coupling to the bridge 1140.

Figure 15:
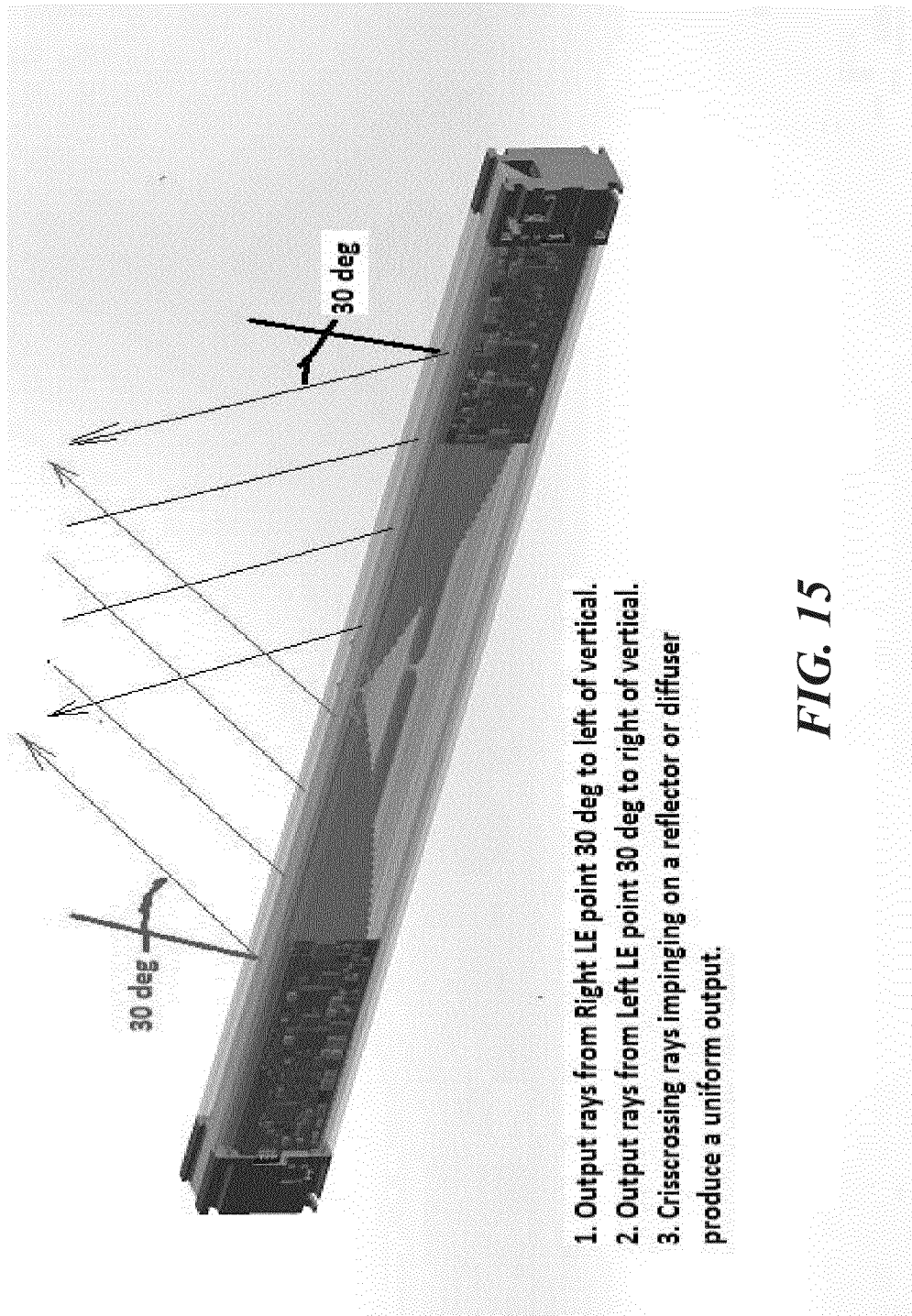
FIG. 15 shows the relative angles of the emitted rays from two coupled linear light modules.

As shown in FIG. 15, the light emitted from emission surface 1130 by the light pipe 1110 is angled from the vertical in a plane defined by the longitudinal axis of the light pipe and the height of the light pipe (i.e., the plane of the paper as shown in FIG. 15). The light is angled from vertical because this is the condition for which the condition for TIR is no longer met. In some embodiments, the angle of is approximately 30 degrees. As shown in the example light configuration of FIG. 15, two light pipes can be placed end to end, where the light pipes face in opposite directions. Rays emitted from vertical in a first direction from the first light pipe, and rays emitted from vertical in a second direction, opposite from the first, from the second light pipe can be designed to strike a reflector or a diffuser to make the light appear uniform in the far field to an observer. As a result, the observer will no longer be able to identify that the light coming from each of the light pipes was originally emitted in different directions.

Diffusers

In some cases, the embodiments of the light pipe depicted in FIGS. 2-4 as well as other embodiments of a linear light guiding pipe can provide a more uniformly mixed illumination output through the use of a diffuser on the exit surface, for example, exit surface 221 of the light pipe 220 in FIG. 2. The diffuser functions by breaking up the light reaching the emission surface at an angle smaller than the critical angle and re-directing portions of that light into different directions. A portion of the light will leave the exit surface after being diffused by the diffuser, while another portion of the light will re-enter the light pipe to be reflected within the light pipe until it reaches the exit surface again and is re-diffused by the diffuser on the exit surface.

The diffuser can be just as effective in mixing the light when placed on the bottom surface of the light pipe opposite the exit surface. However, rather having a portion of the light that strikes the bottom surface at smaller than the critical angle being diffused by the diffuser and permanently exiting the light pipe, the light is reflected back into the light pipe by the reflective surface outside the light pipe. This reflected light is diffused again by the diffuser when re-entering the light pipe. The light will be reflected within the light pipe, either by TIR or by being directly reflected by a reflective surface outside of the light pipe, eventually being emitted from the exit surface of the light pipe.

The use of the diffuser on either the exiting surface or the opposite surface of the light pipe helps to mix the light from the different LED sources inside the light pipe to produce a more uniform illumination at the exit surface of the light pipe. Without the use of a diffuser, there can be gradients in the intensity of the light within the light pipe. For example, the intensity of the light seen from one end of the light pipe, for example, looking into end face 225 of the light pipe 220 in FIG. 2 can be stronger than the intensity of the light seen looking into the opposite end face 226 of the light pipe 220.

Various materials can be used on the emission surface and/or the opposite surface of the light pipe to homogenize the light in the light pipe, for example, a diffusive material such as a laminated diffusion film, a molded textured surface, a diffusive reflector, and/or a spectral reflector. In some embodiments, various combinations of shapes and materials can be used on the emission surface and/or the opposite surface. For example, the diffusive material need not cover the entire emission surface or the entire opposite surface. The diffusive material can be used in one or more discrete sections along the light pipe in different patterns, either uniform or non-uniform.

Alternatively or additionally, more than one type of material can be used in different patterns along the emission surface and/or the opposite surface of the light pipe. For example, a diffusive material can be alternated with a spectral reflector along the length of the light pipe.

In some embodiments, a brightness enhancement film, made by, for example, 3M of Maplewood, Minn. can be used. The brightness enhancement film is directional with grooves in the film aligned in a particular direction. In some embodiments, the brightness enhancement film can be positioned with the grooves at one or more angles, for example, a uniform or non-uniform patchwork of groove angles can be used along the emission surface and/or the opposite surface. The brightness enhancement film can be used either alone or with another type of diffusive material in a uniform or non-uniform pattern.

A separate steering element can be placed over the emission surface of the light pipe with an air gap between the steering element and the emission surface to further reduce the axial component of the emitted light. In some embodiments, the steering element has a saw tooth pattern on the surface closest to the light pipe to diffract the light in different directions.

The configurations of the light pipe depicted in FIGS. 10A-10H and FIG. 11 as well as other embodiments of the linear light pipe can provide a more uniformly mixed illumination output through the use of a diffuser 1080, 1180 between the optical coupling element and the light pipe. Further, a diffuser can be used as the light extraction element 1190 shown in FIG. 11.

A Patterned Light Diffuser

A diffuser can be the final mixing element for eliminating any remaining hot-spots by diffusing light exiting an optical element, such as a light pipe, or an optical coupling element that couples light from LEDs, into a large range of angles to homogenize both the color and intensity variations at the diffuser exit, thus providing more uniform illumination.

Better mixing is typically achieved by increasing the diffusion angle of the diffuser to cause the light impinging on the diffuser to spread over a wider range. As a result, light from the various hot spots on the diffuser interfere with each other and decreases the color and intensity gradients perceptible in the output beam.

However, higher diffusion usually results in higher losses so there is a tradeoff between higher diffusion and lower light output. Described below are two manufacturing processes by which better light mixing can be achieved with lower losses than with conventional manufacturing processes. The first process replaces plastic diffusers with coated glass so that much higher optical flux densities can be diffused without degradation of the plastic with time and temperature.

A patterned diffuser with plain uncoated glass between patterned sections can effectively cause a large amount of light mixing while still allowing a significant amount of the light to pass with low loss through the glass.

Figure 17:
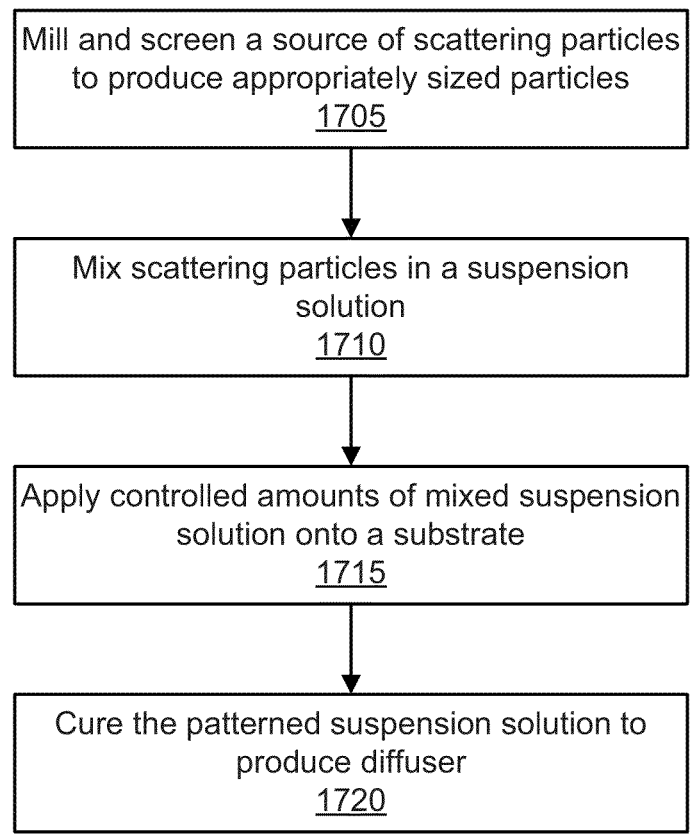
FIG. 17 is a flow diagram illustrating an example process of creating a patterned diffuser.
Figure 18:
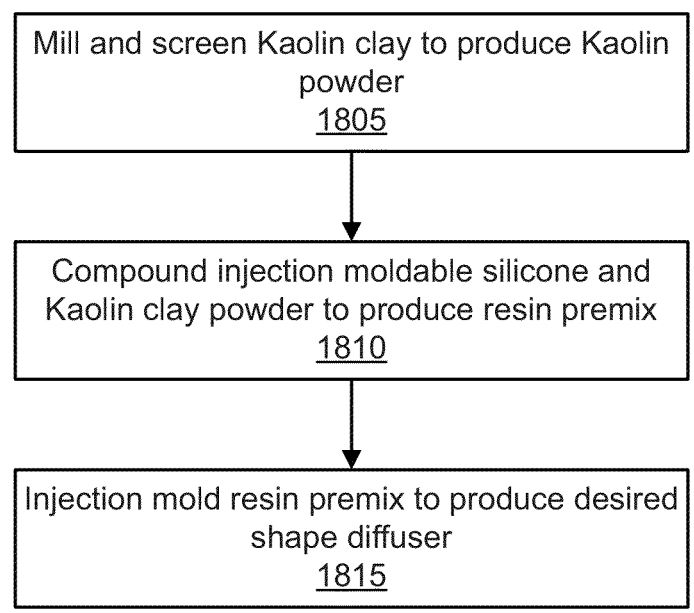
FIG. 18 is a flow diagram illustrating another example process of creating a diffuser.

FIG. 17 is a flow diagram illustrating an example process of creating a patterned diffuser. At block 1705, scattering particles, such as Kaolin clay, are milled and screened for particles having a size approximately less than or equal to two microns, or any other suitable size.

Then at block 1710, the scattering particles are mixed in a suspension solution. In some embodiments, the suspension solution can be a silicone adhesive, such as made by DuPont of Wilmington, Del.

Next, at block 1715, controlled amounts of the mixture are patterned onto a substrate, such as a glass substrate. In some embodiments, the mixture can be squeezed through a pattern of micro-holes to deposit drops onto the glass substrate. The pattern of holes can include holes with a pre-determined diameter and a predetermined pitch. In some embodiments, the mixture can be made thinner to have a lower viscosity, and the resulting mixture can be deposited onto the glass substrate by spin-coating or spraying. This results in a smooth layer, but the resulting diffuser will not have a pattern.

At block 1720, the glass substrate with the deposited mixture is heated, for example, in an oven, until the adhesive has cured. The result is a light diffuser that can withstand high optical flux densities.

FIG. other is a flow diagram illustrating an example process of creating a diffuser. As described above, at block 1805, scattering particles, such as Kaolin clay, are milled and screened to produce Kaolin powder. The proper ratio of silicone and scattering particles can be experimentally determined for the desired diffusive effect.

Then at block 1810, the injection moldable silicone is compounded with the scattering particles to produce a resin premix. At block 1815, the resin premix can be injection molded to produce diffusers in various desired shapes.

LED Array

The LED array used with the optical coupling element can have any number of LEDs, for example, a 2×5 LED array can be used. The wavelengths of light emitted by the LEDs in the array are selected so that the combined light from all the LEDs generate a desired CCT. The array may include LEDs having different colors and one or more white LEDs. Because the mixing of the light from the multiple LEDs achieved from bouncing the light against the surfaces of the optical coupling element and light pipe and the outer reflective surfaces before being emitted from the emission surface of the light pipe is not perfect, it would be beneficial to select the placement of the individual colored LEDs in the array to 'pre-mix' the light to produce a more uniform light distribution at the emitting surface of the light pipe without discernible bands of colors.

In embodiments of the linear light module described above having an optical coupling element emitting directly into an adjacent light pipe, a horizontal banding effect may be visible along the emission surface of the light pipe. The banding effect arises due to insufficient mixing of the light emitted from adjacent LEDs.

FIGS. 12A-12C show three different placements of LEDs in an LED array. The symbol W corresponds to a white color LED; R corresponds to a red color LED; A corresponds to an amber color LED; G corresponds to a green color LED; and B corresponds to a blue color LED. FIG. 12A shows a 2×5 LED array where the top three rows of LEDs do not additively combine to produce light that is nearly white. As a result, if there is insufficient mixing of the light from the array by the optical coupling element and the light pipe, bands of colored light corresponding to the additive color of each of the rows of LEDs in the array may be seen periodically along the emission surface. Thus, the top row of the LED array causes periodic red bands of light along the emission surface of the light pipe, the second row causes periodic amber bands of light, and the third row causes periodic bands of greenish-blue light.

Figures 13A, 13B:
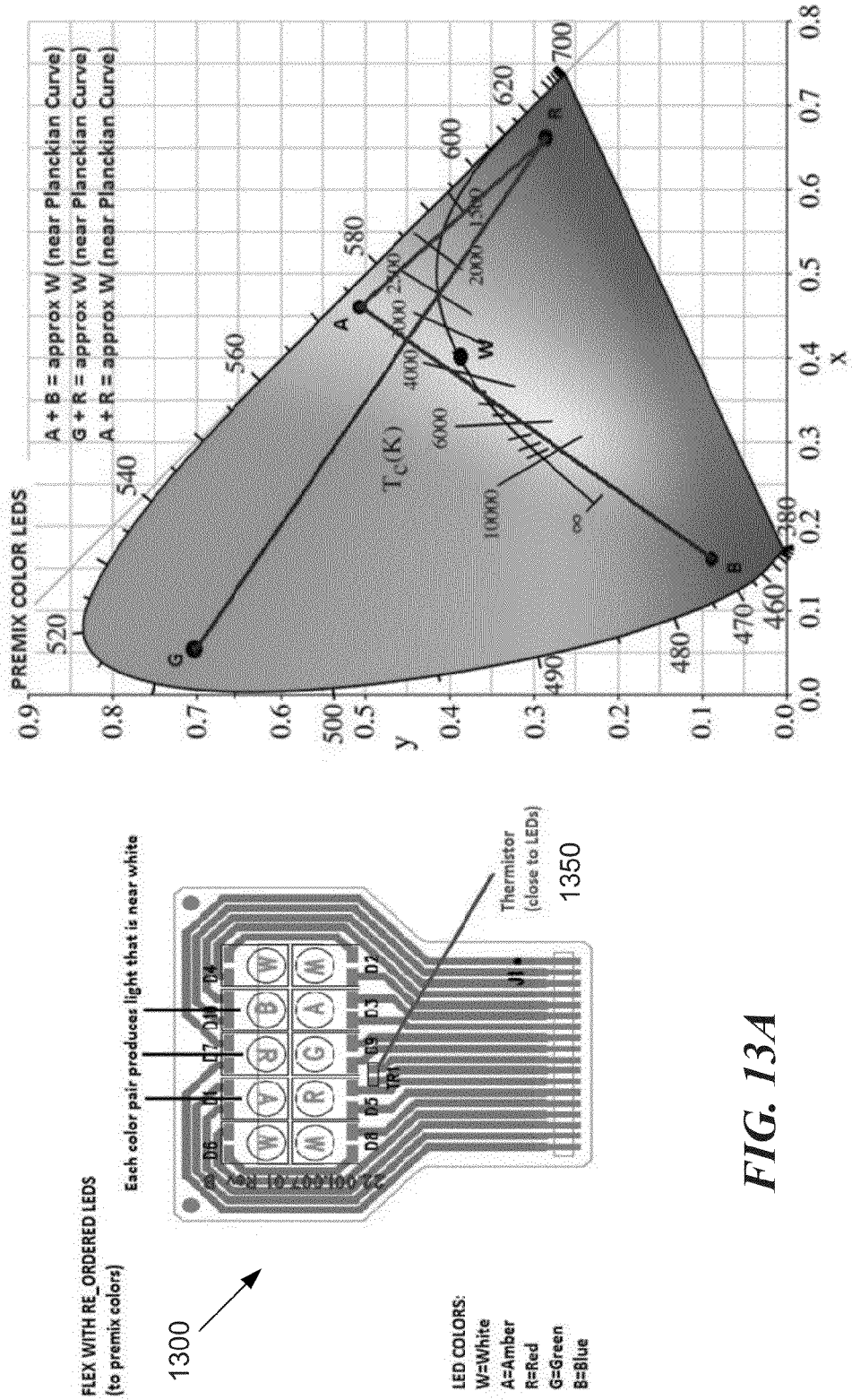
FIG. 13A shows the placement of different color LEDs in an LED array that eliminates the banding effect.
FIG. 13B shows the relative locations of the LEDs in the array on a CIE color diagram.

One way to eliminate color bands along the emission surface is to select pairs of LED colors that are nearly opposite each other in chromaticity space across the Planckian locus to be placed adjacent to each other. FIG. 13 shows a CIE 1931 chromaticity space diagram with a Planckian locus, the path that the color of a black body takes as the blackbody temperature changes. Each LED color in the LED array is represented by a dot on the diagram and is labeled with the first letter of the color emitted by that LED (R for red, A for amber, G for green, B for blue, and W for white). Lines between the dots connect pairs of LED colors that when mixed, produce nearly a white color. For example, the red color LED (R) is paired with the amber color LED (A); the amber color LED is paired with the blue color LED; and the red color LED is paired with the green color LED. FIGS. 12B and 13A show a 2×5 LED array with these LED color pairings. The light emitted by a linear light module that uses this placement configuration for the LEDs in the LED array does not exhibit discernible color bands across the emission surface.

FIG. 12C shows a 3×3 LED array where each row of three LEDs produce nearly a white color. There is a white LED in the center of each row, and the white light is combined with a red color LED and an amber color LED in the first row, with a green color LED and a red color LED in the second row, and with an amber color LED and a blue color LED in the bottom row.

Because it is beneficial to pre-mix the light as much as possible as early as possible before being emitted from the emission surface of the light pipe, a diffuser 1180 can be added to the output surface of the optical coupling element, as shown in the example light pipe configuration of FIG. 11. The diffuser 1180 diffuses the light exiting the optical coupling element 1150 prior to being mixed as it reflects from the surfaces of the light pipe 1110 and the outer reflective surfaces.

Figure 21:
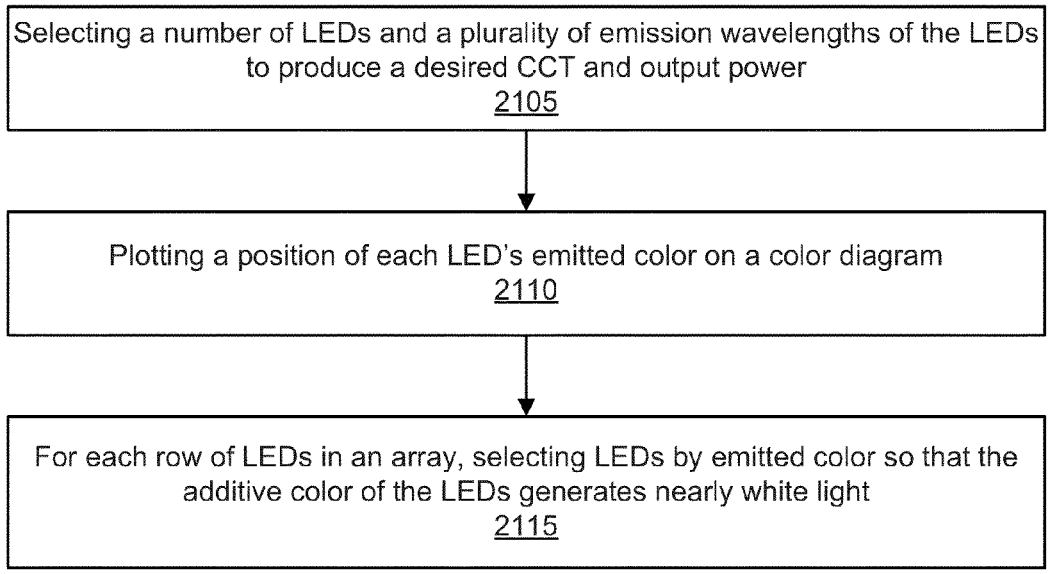
FIG. 21 is a flow diagram illustrating an example process of determining relative placement locations for different color LEDs in an LED array.

FIG. 21 is a flow diagram illustrating an example process of determining relative placement locations for different color LEDs in an LED array. At block 2105, a number of LEDs and a plurality of emission wavelengths of the LEDs are initially selected to produce a desired CCT and output power. Then at block 2110, each of the corresponding colors for the selected LED emission wavelengths are plotted on a color diagram. At block 2115, for each row of LEDs in an LED array, the LEDs are selected by emission color so that the additive color emitted light of the LEDs in a row generates nearly white light.

Providing a Thermal Path for Heat Generated by the LEDs

Figure 5:
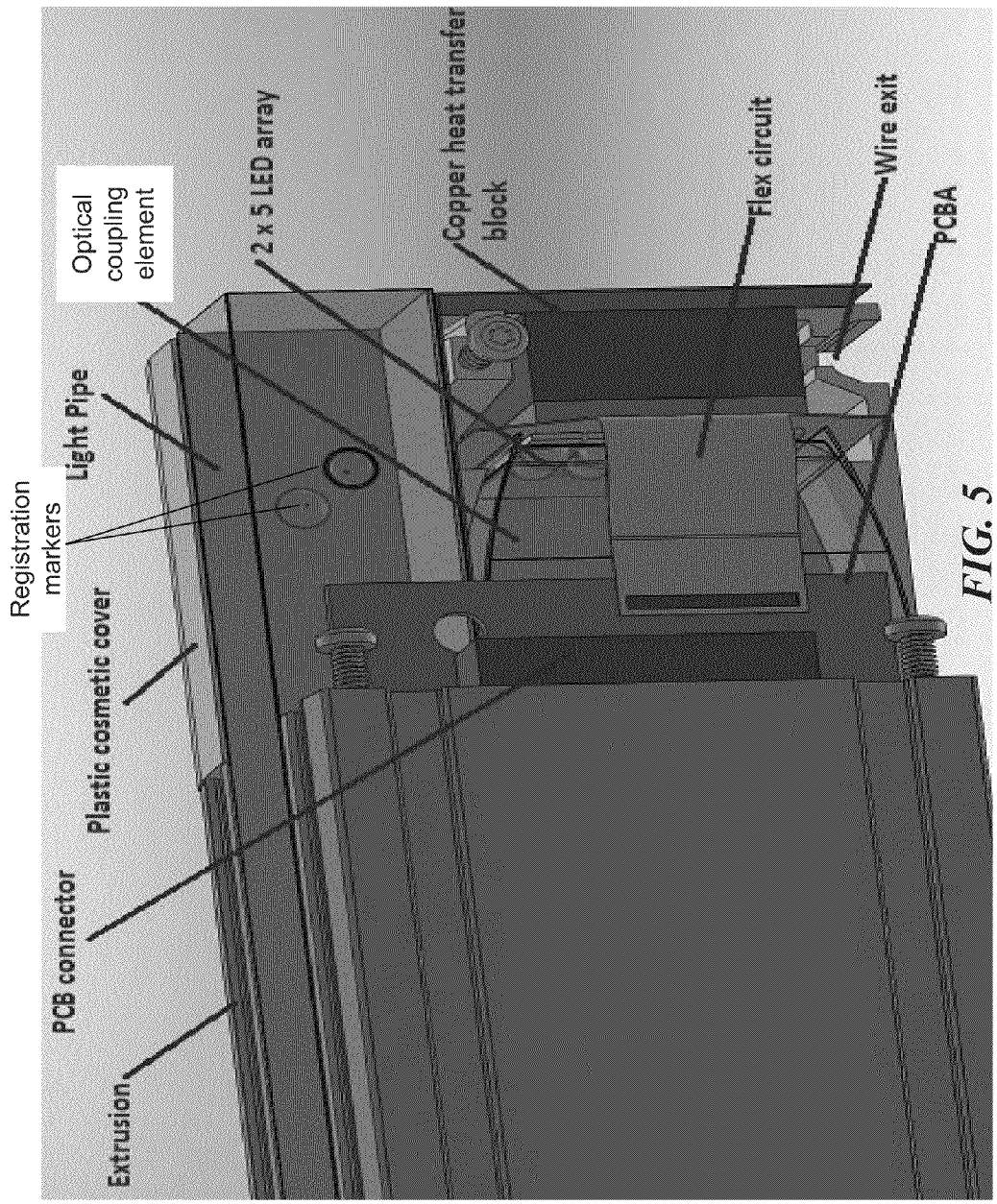
FIG. 5 is a diagram of example components that drive a linear light module.

FIG. 5 shows example elements in the linear light module 800 that generate the illumination provided by the module. In the example of FIG. 5, the light source is a 2×5 LED array. However, any number of LEDs in any configuration can be used as the light source. The LED array is coupled to the optical coupling element 100 as described above.

The electronics for driving the LED array are included in a printed circuit board assembly (PCBA) that is coupled to the LED array through a flex circuit. A flex circuit is used to couple the PCBA to the LED array because the flex circuit allows for thermal expansion of elements due to heating by the LEDs without impacting the alignment of the LEDs with the optical coupling element 100.

Figure 6:
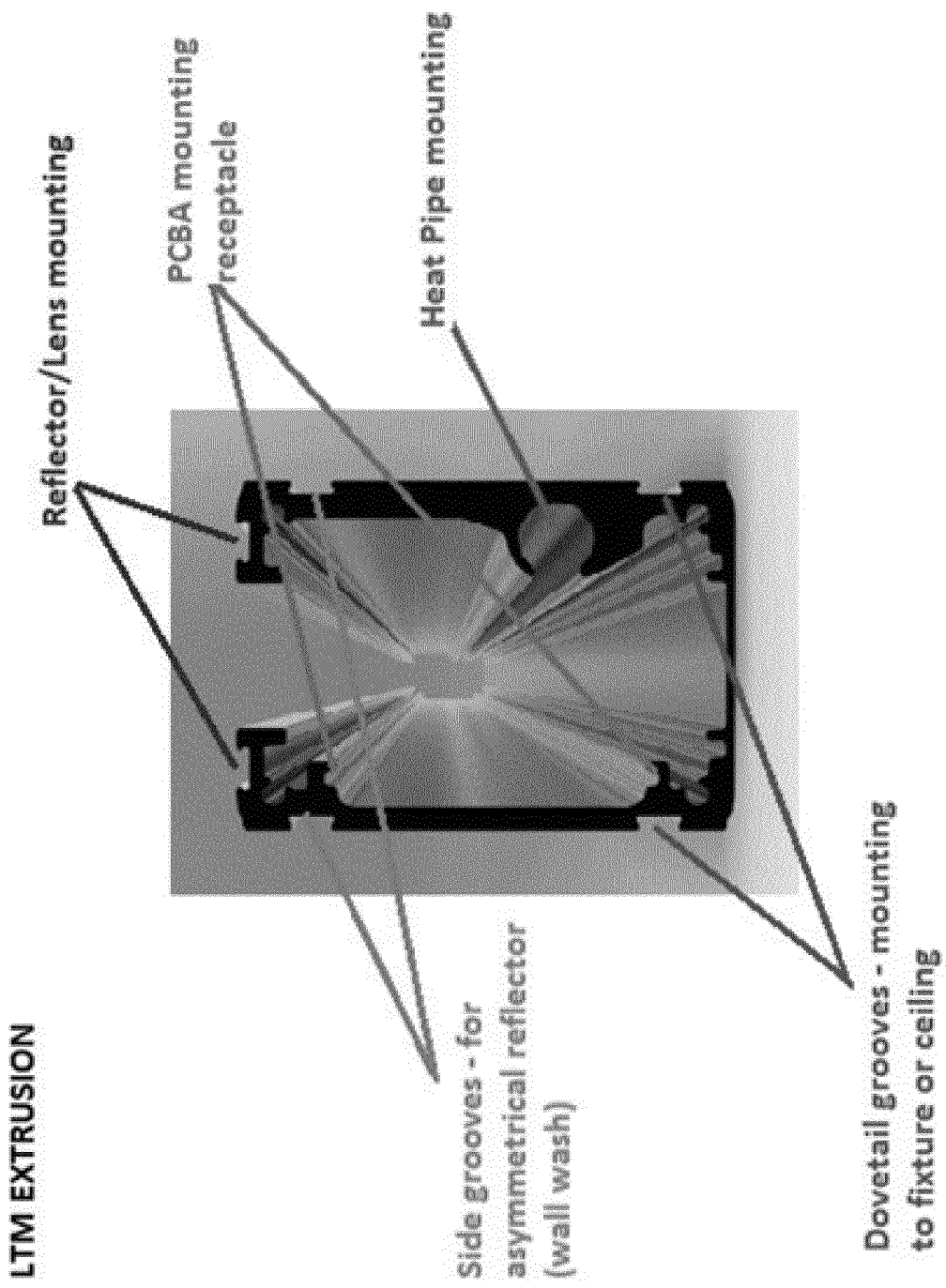
FIG. 6 shows an end view of an example housing of a linear light module.

Coupled directly to the flex circuit is a heat transfer block made from a thermally conductive material, such as copper. The heat transfer block conducts the heat generated by the LED array to a heat pipe that is positioned along the inside of a housing of the light module. In some embodiments, the housing is made from a thermally conductive material, such as aluminum. Thus, there is a thermal path for the heat generated by the LEDs to the aluminum housing. The mounting for the heat pipe is shown in FIG. 6. The heat pipe is also made from a thermally conductive material that transfers heat to the housing. The housing acts as a heat sink and is in contact with the environment to dissipate heat generated by the LEDs from the light module.

Figure 19:
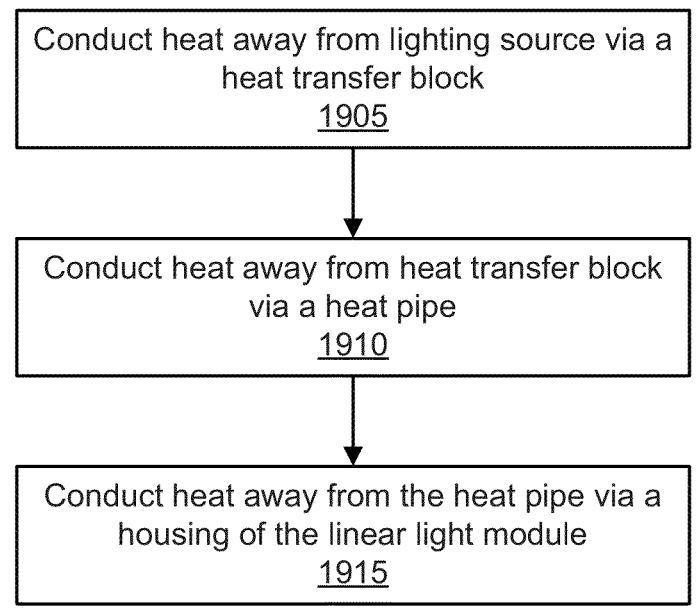
FIG. 19 is a flow diagram illustrating an example process of removing heat from a linear light module.

FIG. 19 is a flow diagram illustrating an example process of removing heat from a linear light module. At block 1905, heat is conducted away from the lighting source via a heat transfer block. Then at block 1910, heat is conducted away from the heat transfer block via a heat pipe. And at block 1915, heat is conducted away from the heat pipe via a housing of the linear light module and the lighting source.

FIG. 5 also shows registration markers that are used to pin the light pipe and the housing together at a single point, and yet allow them to move relative to each other due to different thermal coefficients that result in different rates of thermal expansion. The housing has a hemispherical bump, and the light pipe has a matching hemispherical recess. FIG. 7A shows the back side of the view shown in FIG. 5 with a better view of the hemispherical recess 722 in the light pipe 720. For reference, light from the 2×5 LED array 752 is coupled to the flex circuit 750, and the light from the LEDs is coupled by the optical coupling element 710 to the light pipe 720. The heat pipe mounting 730 is also shown in the housing 740. In some embodiments, the shape of the matching bump and recess can be different from hemispherical. The dimensions of the recess in the light pipe is small so that the light within the light pipe is effected a minimal amount, yet large enough to prevent the light pipe from moving.

Figure 7B:
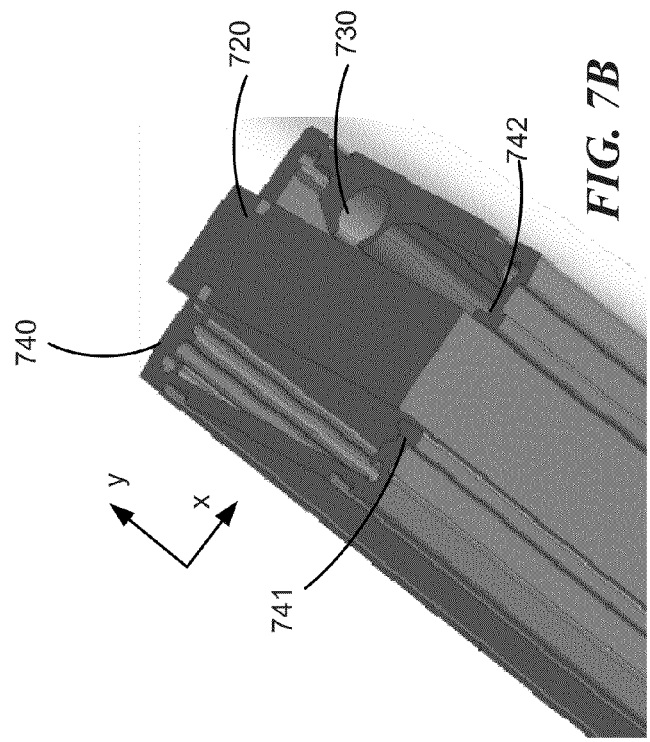
FIGS. 7A-7B show views of the ends of an example linear light module.
Figure 7A:
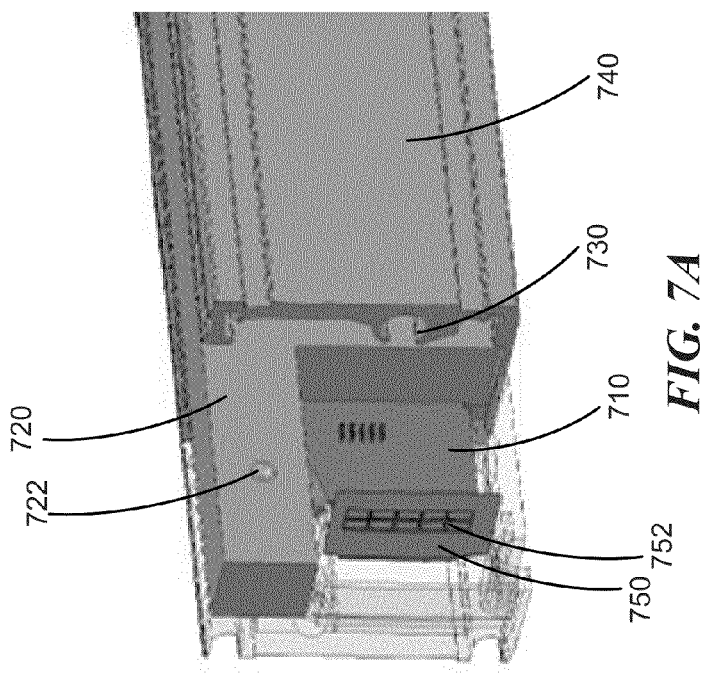

FIG. 7B shows the distal end of the light pipe 720 and housing 740. Because the light pipe is only pinned to the housing at a single location, the light pipe can expand longitudinally along the length of the lighting module (in the z-direction) relative to the housing. Although the light pipe cannot move in the x-direction because it is clamped between the two sides 741, 742 of the housing 740, the light pipe 720 can also expand in the y-direction between the sides 741, 742 of the housing.

By allowing the light pipe the freedom to move relative to the housing, stress due to thermal expansion is relieved to prevent breakage of the LEDs.

Figure 20:
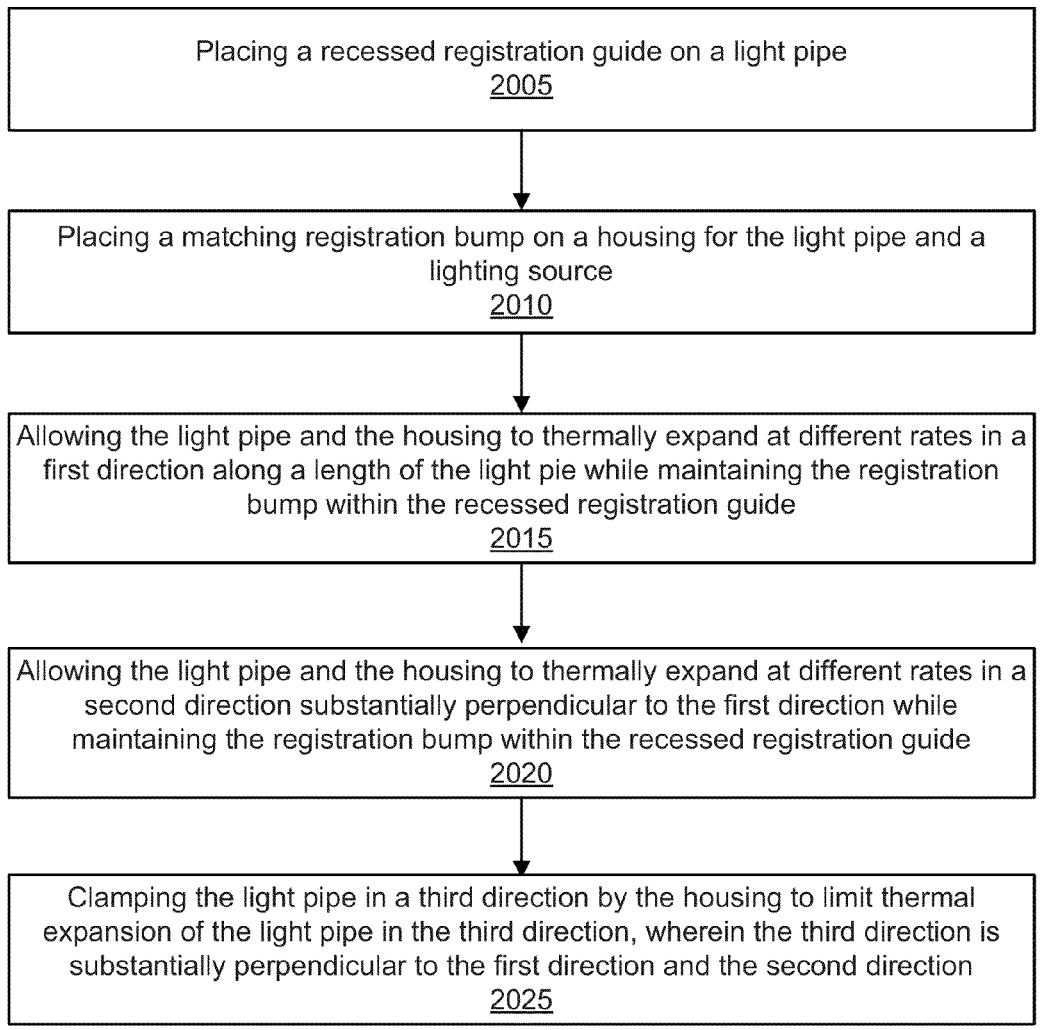
FIG. 20 is a flow diagram illustrating an example process of holding a light pipe in place relative to a housing when the light pipe and the housing have different thermal coefficients.

FIG. 20 is a flow diagram illustrating an example process of holding a light pipe in place relative to a housing when the light pipe and the housing have different thermal coefficients. At block 2005, a recessed registration guide is placed on a light pipe. Then at block 2010, a matching registration bump is placed on a housing for the light pipe and a lighting source.

Next, at block 2015, the light pipe and the housing are allowed to thermally expand at different rates in a first direction along a length of the light pipe while maintaining the registration bump within the recessed registration guide. At block 2020, the light pipe and the housing are allowed to thermally expand at different rates in a second direction substantially perpendicular to the first direction while maintaining the registration bump within the recessed registration guide. Finally, at block 2025, the light pipe is clamped in a third direction by the housing which limits thermal expansion of the light pipe in the third direction, wherein the third direction is substantially perpendicular to the first direction and the second direction.

Mechanically Coupling Together Multiple Linear Light Modules

The linear light module 800 shown in FIG. 8 uses a light pipe that has end faces that are flat and perpendicular to the axis of the light pipe, such as in the example light pipes of FIGS. 2-4. When the linear light module 800 is used as a stand-alone unit, the end faces of the light pipe, for example, surfaces 225, 226 in FIG. 2 are covered with a reflective surface to reflect light exiting these surfaces back into the light pipe to bounce around until eventually being emitted through the emission surface 221.

In some embodiments, more than one linear light module 800 can be coupled together to form a longer continuous emission surface. FIG. 9 shows an example system where four linear light modules 910, 920, 930, 940 are coupled together as a system 900. In this case, the light pipe of each of the linear light modules 910, 920, 930, 940 touch, or nearly touch, each adjacent light pipe to form a single continuous linear emission surface. The example system of FIG. 9 shows three types of modules, a primary module 910 on the right of the system, two secondary modules 920, 930 in the middle of the system, and an end unit 940 on the left end of the system.

The primary module 910 has a reflective end cap on the end of its light pipe nearest to the LED sources, corresponding to, for example, surface 226 of light pipe 220 in FIG. 2. The opposite end of the light pipe, corresponding to, for example, surface 225 in FIG. 2, is not covered by a reflective material. Thus, light escaping from this surface of the light pipe of module 910 enters the adjacent light pipe of the next light module 920.

For the secondary modules 920, 930, neither end of the light pipe is covered so that light can be transmitted between the light pipes of the four modules 910, 920, 930, 940.

For the end module 940, the end of the light pipe farthest from the LED sources, corresponding to, for example, surface 225 of light pipe 220 in FIG. 2 is covered with a reflective end cap to prevent light from escaping from this surface. The opposite end of the light pipe closest to module 930 is not covered with reflective material to permit light from the light pipe of module 940 to enter the light pipe of the module 930, and to permit light from the light pipe of module 930 to enter the light pipe of module 940.

A person of skill in the art will appreciate that the length of the light pipes can be designed to be a single length (e.g. one foot or two foot long light pipes), different standard lengths (e.g., one foot, two feet, three feet, etc.), or customized lengths. Thus, the linear light modules can be used as modular building blocks for designing a lighting system having various lengths FIG. 9 shows four two-foot modules coupled together to form a continuous eight foot long light emission surface. Each two-foot module can have a single two-foot long light pipe having a single LED array, for example a 2×5 array. Alternatively, each two-foot module can be made up of two one-foot long light pipes where each light pipe couples light from a separate LED array, for example, two 2×5 arrays of LEDs can drive the two-foot module together.

Two linear light modules that each use light pipes that do not have flat end faces, such as the light pipes shown in the examples of FIGS. 10 and 11 can be paired together to form a single composite light emission surface, as shown in the example configuration of FIG. 15. The light pipes are placed end to end where the farthest end of the light pipe from the optical coupling element of a first light pipe is placed closest to the counterpart end of the second light pipe farthest from the optical coupling element. In some embodiments, each light pipe building block is approximately one foot long, providing a two-foot long light when two light pipes are coupled together. Each light pipe has its own LED array source. Thus, with two light pipes, twice the light is emitted as compared to a single light pipe. The length of the composite light emission surface can be extended by adding on additional modules, either as a single unit or in pairs as described above.

In one embodiment, the linear light modules are designed to attach from a fixture, a wall, or the ceiling. To permit the light pipe of the adjacent linear light modules to touch, or nearly touch, a mechanical system is used that clips the adjacent linear light modules together. In one embodiment, the linear light modules should be able to slide directly into place from below (in a direction perpendicular to the emission surface) without needing to slide into place horizontally because there is no room to slide the modules horizontally.

The linear light modules can be clipped together using the dovetail grooves in the extruded housing of the modules shown in FIG. 6. In one embodiment, a clip or other fastener can be used with these grooves to mechanically couple together two adjacent linear light modules.

In one embodiment, the grooves can be used with a rail system so that the linear light modules can be attached together using a rail, and a user can use the rail to attach the linear light modules together or to a particular surface, such as a wall or ceiling.

In one embodiment, the side grooves shown in FIG. 6 can be used to clip together adjacent light modules. Alternatively or additionally, optics such as reflectors can be clipped onto the light module using the side grooves. Similarly, the reflector/lens mounting near the emission surface of the light pipe can also be used for attaching optics onto the module.

Communications and Power Transmission Among Coupled Light Modules

Each lighting module has a PCBA that includes the electronics for driving the LED array, and the PCBA has two connectors. One connector (the near connector) is near the LED array. The other connector (the far connector) is on the far side of the light module. These connectors can be used to optionally couple to adjacent light modules so that power and communication signals can be sent between light modules.

The system 900 shown in FIG. 9 has four coupled light modules 910, 920, 930, 940, and the modules are mechanically coupled as described above. Additionally, each of the modules has a PCBA 911, 921, 931, 941 with two connectors that can be used to electrically couple adjacent modules so that power and/or communication signals can be passed between modules. The near connector of PCBA 911 is not used because module 910 is the unit on the farthest right of the system 900. The far connector of PCBA 911 is coupled through an electric cable, e.g. a flat cable, to the near connector of PCBA 921. Similarly, the far connector of PCBA 921 is coupled through an electric cable to the near connector of PCBA 931, and the far connector of PCBA 931 is coupled through an electric cable to the near connector of PCBA 941. The far connector of PCBA 941 is not used because module 940 is the unit on the farthest left of the system 900.

The cables plug into the near connector of the PCBA through a window, and the windows can be covered with a plate. This setup allows each light module 910, 920, 930, 940 to slide into place, for example, as ceiling units. Because the emission surface of each light pipe seamlessly contacts the neighboring light pipe, there is no room to electrically couple the units using integrating sockets or any other method that would require a sideways movement of the module.

The electric cables can include a first cable that is used to transmit communication signals between the light modules 910, 920, 930, 940. In one embodiment, one of the light modules is a master unit, for example, primary module 910. Only primary module 910 receives commands from an external source, for example, either wirelessly through a radio receiver or through wired means. The commands can include, but are not limited to, tuning the color temperature of the light emitted by all of the modules, adjusting the intensity of the illumination, calibrating the light modules, and turning the modules on or off. Primary module 910 then re-transmits the commands to the rest of the modules 920, 930, 940 in the system 900 through the electric cables. Because the other modules 920, 930, 940 do not have a radio receiver or a wired signal receiver, the cost of the system is reduced.

In one embodiment, each of the modules 910, 920, 930, 940 of the system 900 has a wired or wireless receiver to receive commands from an external source. Then the primary module 910 or any other module 920, 930, 940 can re-broadcast the commands to the other modules through the electric cables. In this case, the communications through the flat cables act as a redundant communication system. If a module has already received the command from the external source, it can ignore the re-broadcast command.

The electric cables can also include a second cable that is used to transmit power between the light modules 910, 920, 930, 940. In one embodiment, the primary module 910 can include a power supply large enough to provide power to the other three modules 920, 930, 940. Depending on the strength of the power supply, a single module can provide power through the electric cables to even more modules. Alternatively, multiple power supplies can be used within the system, depending upon how many modules need power.

Figure 14:
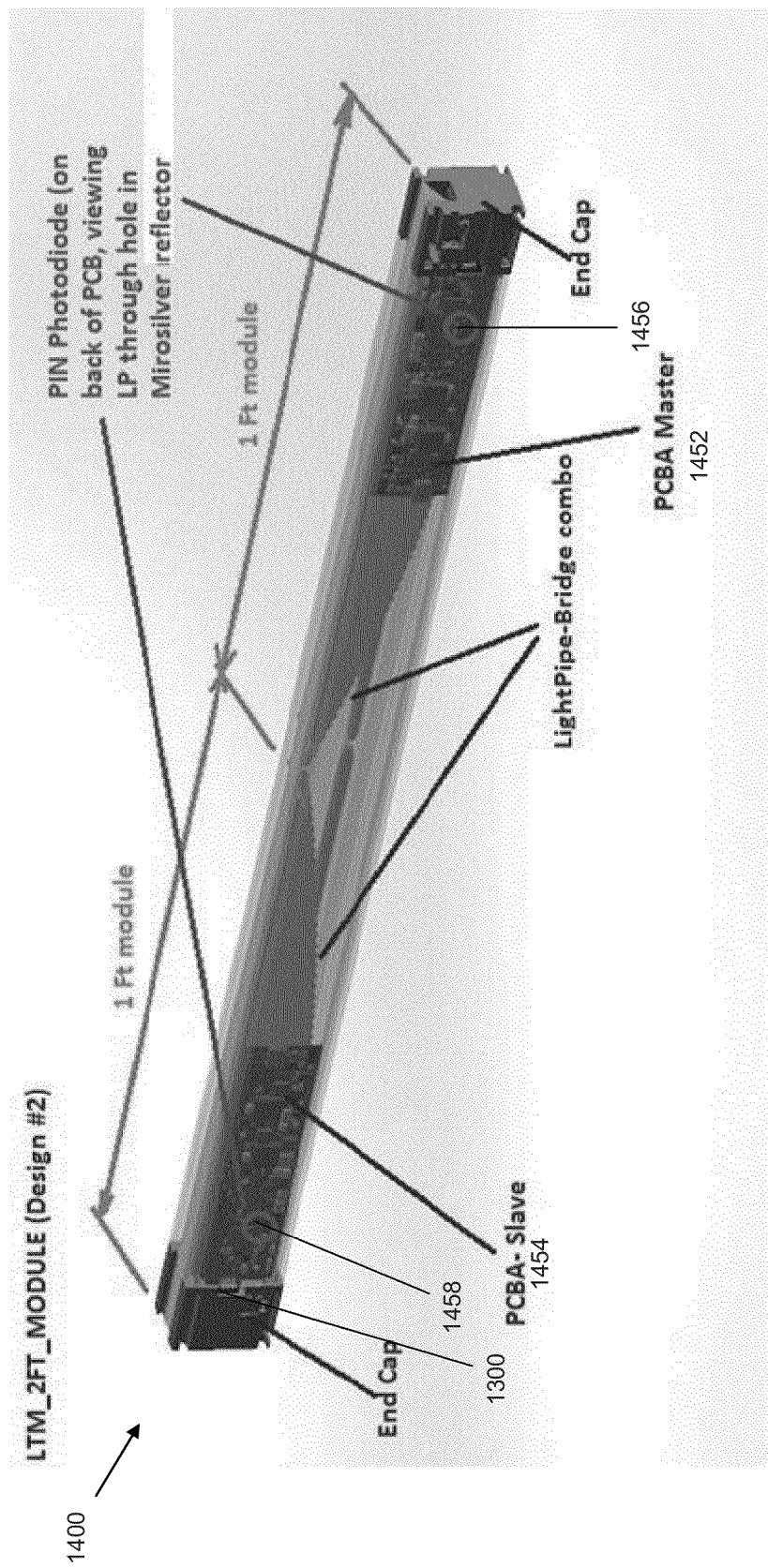
FIG. 14 is a diagram of example components of two linear light modules coupled together.

FIG. 14 includes a master printed circuit board assembly (PCBA) 1452 and a slave PCBA 1454 on opposite ends of a composite linear light module 1400 that includes two individual linear light modules coupled together. In one example, the master PCBA 1452 is electrically coupled to the slave PCBA 1454. Both the PCBA 1452 and the PCBA 1454 are printed circuit boards or other forms of embedded circuitry. The master PCBA 1452 includes a master controller module, such as a microprocessor, a radio communication device, and a memory module.

The master PCBA 1452 includes a first optical sensor 1456 to provide optical feedback during calibration. The slave PCBA 1454 also includes a second optical sensor 1458 for feedback to the master PCBA 1452. The first optical sensor 1456 and the second optical sensor 1458 can be broad spectrum optical sensors, such as PIN diodes. The PIN diodes are diodes with wide, lightly doped near intrinsic semiconductor region between of a p-type semiconductor and an n-type semiconductor region. One example of a suitable PIN diode that can be used is the PD15-22C/TR8 PIN diode manufactured by Everlight Electronics Co., Ltd. Of New Taipei City, Taiwan. Both the master PCBA 1452 and the slave PCBA 1454 can include one or more thermal sensors near the LED array, such as the thermistor 1350 of FIG. 13A. The thermistor changes resistance based on temperature of its environment.

The PIN diodes 1456, 1458 are oriented on the back side of the printed circuit board assemblies seen in FIG. 14, facing toward a side surface of the light pipe. As described above, the side surfaces of each light pipe are backed by a reflective surface. Consequently, a hole is formed in the reflective surface near each PIN diode to allow a small portion of light to escape to be sensed by the PIN diode.

The master PCBA 1452 includes circuitry to perform self calibration on the fly. The slave PCBA 1454 can also perform self calibration on-the-fly. Self calibration can be performed via optical feedback through the optical sensor 1456. The LEDs degrade over time. Some color LED degrades more so than others. For example, the red LEDs degrade most with life and the blue LEDs are most resistant to degradation. Hence, during the self calibration the red color over blue color ratio is measured and compare with factory values. Then the blue LED current is lower to reset the present color ratio to that of the factory setting as the red color LEDs degrade.

Figure 16:
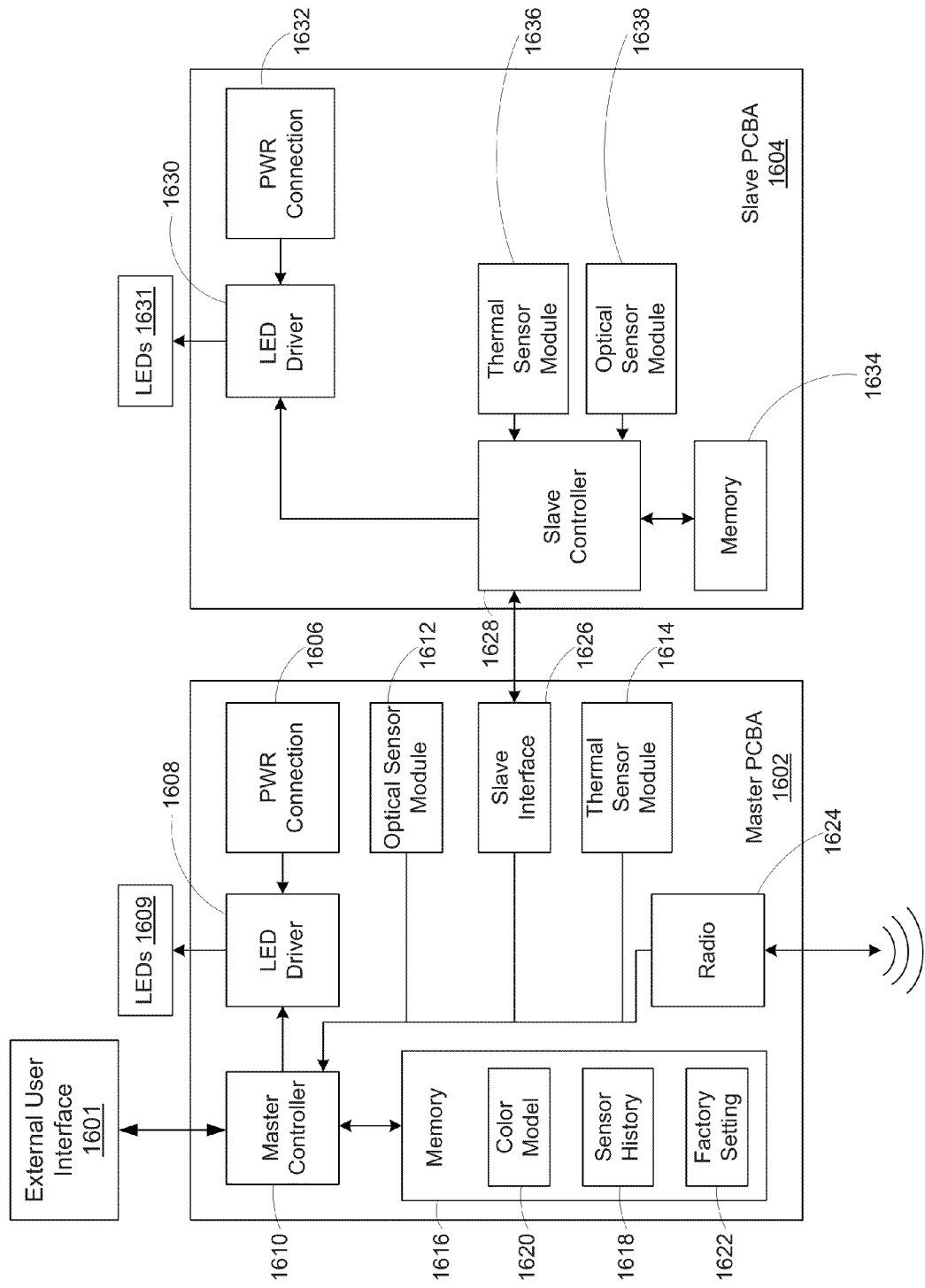
FIG. 16 illustrates an example block diagram of a master PCBA 1602 coupled with a slave PCBA 1604.

FIG. 16 illustrates an example block diagram of a master PCBA 1602 coupled with a slave PCBA 1604. The master PCBA 1602 can be the master PCBA 1452 of FIG. 14. The slave PCBA 1604 can be the slave PCBA 1454 of FIG. 14. The master PCBA 1602 includes a power connection 1606 and a LED driver 1608. The power connection 1606 provides electrical power to the LED driver 1608 to drive a first plurality of LEDs 1609. The LED driver 1608 can be configured by a master controller module 1610. The master controller module 1610 is electrical circuitry for configuring the LED driver 1608. The master controller module 1610 can be a microprocessor or other controller type embedded within the master PCBA 1602. Commands can be sent to the master controller module 1610 from an external user interface 1601, such as dimming the intensity of the light with the same CCT or changing the CCT of the light. Further, the mater controller module 1610 can perform algorithms for tuning the CCT of the LEDs such as described in U.S. patent application Ser. No. 13/766,695 entitled, "System and Method for Color Tuning Light Output from an LED-Based Lamp."

Communications between the external user interface 1601 and the master controller module 1610 can be via RS-232 or RS-485 standards, for example. Similarly, communications between the master controller module 1610 and the slave controller 1628 can also be via RS-232 or RS-485 standards, for example.

The master controller module 1610 can receive inputs from an optical sensor module 1612. The optical sensor module 1612 can be a pin diode, such as the pin diodes illustrated in FIG. 14, coupled to electronic circuitry to transmit a sensed color spectrum to the master controller module 1610. The master controller module 1610 can also receive inputs from a thermal sensor module 1614. The thermal sensor module 1614 can receive temperature information from a thermistor, such as the thermistor 1350 of FIG. 13A, on the master PCBA 1602 or adjacent to the first plurality of LEDs 1609. The sensory information received can be stored on a memory module 1616 of the master PCBA 1602. The sensory information can be stored as a sensor history database 1618. When configuring the LED driver 1608, the master controller module 1610 can refer to a color model 1620 stored on the memory module 1616. The color model 1620 provides a driving signal to produce a particular color spectrum based on an operating temperature and a driving current level. The thermal sensor 1614 can provide the operating temperature.

The first plurality of LEDs 1609 may degrade over time. Some color sets degrade more so than others. For example, a red color set within the first plurality of LEDs 1609 may degrade faster than a blue color set. The master controller module 1610 is configured to calibrate the first plurality of LEDs 1609. In one example, the master controller module 1610 can calibrate the first plurality of LEDs 1609 to return to its factory settings. A factory setting database 1622 can be stored on the memory 1616. The factory setting database 1622 may store ratios of colors, such as a red color intensity over a blue color intensity or an amber color intensity over a blue color intensity. The optical sensor module 1614 can provide color spectrum information to the master controller module 1610 in order to return the present color ratios to the factory setting as according to the factory setting database 1622.

In some embodiments, to determine the present color ratios, the master controller module 1610 can flash each color set of the first plurality of LEDs 1609 and measure the intensity of the color sensed by the optical sensor module 1614. The measured color intensities of different colors can be normalized against a chosen color set, such as blue LEDs, to arrive at the present color ratios of the first plurality of LEDs 1609. The master controller module 1610 can lower a driving current for a blue color set of LEDs amongst the first plurality of LEDs 1609 until the present color ratio with respect to the blue color is the same as the factory setting ratio in the factory setting database 1622.

The master PCBA 1602 can also include a radio module 1624 to communicate with an external control device, such as a remote control. The radio module 1624 may be a radio transceiver or a set of a radio transmitter and radio receiver. The radio module 1624 can receive commands, such as calibration commands or commands to match a particular color spectrum or a particular correlated color temperature (CCT). The radio module 1624 can also transmit the current sensor information, the color model 1620, the sensor history 1618, the factory setting database 1622, or any combination thereof.

The master PCBA 1602 further includes a slave interface 1626 for communicating with the slave PCBA 1604. The slave PCBA 1604 includes a master interface 1628 for communicating with the master PCBA 1602. The master interface 1628 receives configuration messages from the slave interface 1626 of the master PCBA 1602. The configuration messages dictate how a LED driver 1630 of the slave PCBA 1604 drives the second plurality of LEDs 1631. The LED driver 1630 derives its power from a power connection 1632. The configuration received via the configuration messages can be stored in a memory module 1634 of the slave PCBA 1604.

The slave PCBA 1604 can also include a slave thermal sensor module 1636 and a slave optical sensor module 1638 for providing thermal and optical feedback through the master interface 1628, such that the master controller module 1610 can determine the driving signal configuration for the LED driver 1630 of the slave PCBA 1604. The master controller module 1610 can determine the driving signal configuration for the LED driver 1630 the same way it determines the driving signal configuration for the LED driver 1609, such as through calibration.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A system comprising:
   a first lighting module having a first printed circuit board assembly (PCBA), wherein the first PCBA has a first distal connector;
   a second lighting module having a second PCBA, wherein the second PCBA has a second near connector and a second distal connector; and
   a first cable configured to couple the first distal connector to the second near connector,
   wherein the first lighting module and the second lighting module each have a lighting source and a light guide for coupling light from the lighting source and emitting the light in a linear configuration along a length of the light guide, wherein the light guides of the first and second lighting modules are positioned to form one continuous linear configuration of emitted light from the first and second lighting modules wherein the first lighting module has a first receiver to receive a command from an external source, and further wherein the first lighting module is configured to send the received command to the second lighting module via the first cable; and wherein the second lighting module has a second receiver to receive the command from the external source, and further wherein the second lighting module is configured to send the received command to the first lighting module.

2. The system of claim 1, wherein the first lighting module has a power supply, and further wherein at least a portion of power from the power supply is sent through the first cable from the first lighting module to the second lighting module.

3. The system of claim 1, wherein communication signals are sent through the first cable between the first lighting module and the second lighting module.

4. The system of claim 1, wherein the first receiver is a wireless receiver.

5. The system of claim 1, wherein the first receiver is a wired receiver.

6. The system of claim 1, wherein the second receiver is a wireless receiver.

7. The system of claim 1, further comprising:
one or more additional lighting modules, each having an additional printed circuit board assembly (PCBA), wherein each additional PCBA has an additional near connector and an additional distal connector; and
one additional cable for each additional lighting module, wherein each additional cable is configured to couple the additional near connector of one of the one or more additional lighting modules to a distal connector of another lighting module, wherein communication signals are transmitted among the first lighting module, the second lighting module, and the one or more additional lighting modules via the additional cables and the first cable.

8. The system of claim 7, wherein power is transmitted among the first lighting module, the second lighting module, and the one or more additional lighting modules via the additional cables and the first cable.

9. A light source comprising:
a first set of light emitting diodes (LEDs) of at least two different colors;
a first electronic circuitry coupled to the first set of LEDs, the first electronic circuitry for driving the first set of LEDs and a wired interface on the first electronic circuitry to communicate with a second light source linearly disposed next to the light source;
a light pipe configured to receive light emitted by the first set of LEDs, the light pipe including a surface configured for total internal reflection (TIR) when light rays intersect the surface above a critical angle with respect to a normal vector of the surface; and
a shell having a reflective inner surface covering a portion of the light pipe along a length of a pipe axis of the light pipe, the shell having an opening for light to escape along the length of the pipe axis of the light pipe.

10. The light source of claim 9, further comprising an optical sensor adjacent to the surface of the light pipe and outside of the light pipe, the optical sensor coupled to the first electronic circuitry and capable of sensing a color spectrum of light leaking out of the light pipe.

11. The light source of claim 10, wherein the optical sensor is a PIN diode.

12. The light source of claim 10, wherein the light pipe mixes different color light emitted from the first set of LEDs, and wherein the optical sensor senses leaked light from the light pipe that is substantially mixed.

13. The light source of claim 10, wherein the optical sensor senses leaked light through a hole in the shell having the reflective inner surface.

14. The light source of claim 10, wherein the wired interface on the first electronic circuitry is configured to send a reading of the optical sensor to the second light source.

15. The light source of claim 14, wherein the first electronic circuitry is configured to drive the first set of LEDs based on a command received through the wired interface in response to sending of the reading of the optical sensor.

16. The light source of claim 9, further comprising a thermal sensor adjacent to the first set of LEDs, the thermal sensor coupled to the first electronic circuitry.

17. The light source of claim 16, wherein thermal sensor is a thermistor.

18. The light source of claim 16, wherein the wired interface on the first electronic circuitry is configured to send a reading of the thermal sensor to the second light source.

19. The light source of claim 9, further comprising a diffuser between the first set of LEDs and the light pipe.

20. The light source of claim 9, wherein the first electronic circuitry is configured to send a control message to the second light source to adjust currents of the second light source.

21. The light source of claim 20, wherein the first electronic circuitry is configured to receive optical spectrum feedback from the second light source to determine the control message to send to the second light source.

22. The light source of claim 20, wherein the first electronic circuitry is configured to receive thermal feedback from the second light source to determine the control message to send to the second light source.

23. The light source of claim 9, wherein the first electronic circuitry includes a radio communication module configured to provide wireless communication with an external control device.

24. The light source of claim 9, wherein the first electronic circuitry includes a memory storage module configured to store a history of sensor reading from a sensor coupled to the first electronic circuitry.

25. The light source of claim 9, wherein the first electronic circuitry includes a memory storage module configured to store a factory setting color ratio between two specific color sets of LEDs in the first set of LEDs, each specific color set including at least one LED.

26. The light source of claim 9, wherein the first electronic circuitry includes a memory storage module configured to store a color model to determine driving current signal necessary to achieve specific color spectrum from the first set of LEDs under specific operating temperatures.

27. The light source of claim 9, wherein the first electronic circuitry includes a controller module configured to calculate a color ratio between two color intensities of the first set of LEDs, and lower a driving current to a color LED set from the first set of LEDs to reset the color ratio to a stored factory setting on a memory of the first electronic circuitry, the color LED set including at least one LED of the same color.

28. The light source of claim 27, wherein the controller module is configured to receive measurements of color intensities of the first set of LEDs from an optical sensor and the color ratio is calculated based on two of the color intensities.

29. The light source of claim 28, wherein the controller module is configured to flash specific color LED sets of the first set of LEDs in succession such that the optical sensor can capture the color intensities corresponding to each color set of the specific color LED sets.

30. The light source of claim 27, wherein the color LED set is a blue color LED set.

31. The light source of claim 27, wherein the controller module is a microprocessor.

* * * * *